United States Patent
Linehan

(10) Patent No.: US 10,959,110 B2
(45) Date of Patent: Mar. 23, 2021

(54) LENSED ANTENNAS FOR USE IN WIRELESS COMMUNICATIONS SYSTEMS

(71) Applicant: CommScope Technologies LLC, Hickory, NC (US)

(72) Inventor: Kevin Eldon Linehan, Rowlett, TX (US)

(73) Assignee: CommScope Technologies LLC, Hickory, NC (US)

( * ) Notice: Subject to any disclaimer, the term of this patent is extended or adjusted under 35 U.S.C. 154(b) by 192 days.

(21) Appl. No.: 16/073,668

(22) PCT Filed: Mar. 31, 2017

(86) PCT No.: PCT/US2017/025259
§ 371 (c)(1),
(2) Date: Jul. 27, 2018

(87) PCT Pub. No.: WO2017/173208
PCT Pub. Date: Oct. 5, 2017

(65) Prior Publication Data
US 2019/0037416 A1    Jan. 31, 2019

Related U.S. Application Data

(60) Provisional application No. 62/315,823, filed on Mar. 31, 2016.

(51) Int. Cl.
*H01Q 19/06* (2006.01)
*H04W 16/28* (2009.01)
(Continued)

(52) U.S. Cl.
CPC ............ *H04W 16/28* (2013.01); *H01Q 1/246* (2013.01); *H01Q 3/245* (2013.01); *H01Q 3/247* (2013.01);
(Continued)

(58) Field of Classification Search
CPC ....... H04W 16/28; H01Q 15/08; H01Q 3/245; H01Q 19/062; H01Q 25/007;
(Continued)

(56) References Cited

U.S. PATENT DOCUMENTS 4,845,507 A    7/1989 Archer et al.
5,821,908 A    10/1998 Sreenivas
(Continued)

FOREIGN PATENT DOCUMENTS

CN    1672292    9/2005
CN    102751585    10/2012
(Continued)

OTHER PUBLICATIONS

Supplementary European Search Report, for corresponding European Patent Application No. 17776736.5, dated Oct. 14, 2019, 10 pgs.
(Continued)

*Primary Examiner* — Dieu Hien T Duong
(74) *Attorney, Agent, or Firm* — Myers Bigel, P.A.

(57) ABSTRACT

Array antennas include a plurality of lensed multi-beam sub-arrays, where each lensed multi-beam sub-array comprises a RF lens and a plurality of radiating elements that are associated with the RF lens and that are orbitally arranged about the RF lens.

21 Claims, 12 Drawing Sheets

(51) Int. Cl.
*H01Q 1/24* (2006.01)
*H01Q 15/08* (2006.01)
*H01Q 3/24* (2006.01)
*H01Q 25/00* (2006.01)
*H01Q 3/26* (2006.01)
*H01Q 15/10* (2006.01)
*H01Q 21/00* (2006.01)
*H01Q 21/06* (2006.01)

(52) U.S. Cl.
CPC .......... *H01Q 3/2658* (2013.01); *H01Q 15/08* (2013.01); *H01Q 15/10* (2013.01); *H01Q 19/062* (2013.01); *H01Q 21/0025* (2013.01); *H01Q 25/00* (2013.01); *H01Q 25/007* (2013.01); *H01Q 21/06* (2013.01)

(58) Field of Classification Search
CPC ...... H01Q 3/2658; H01Q 3/247; H01Q 15/10; H01Q 21/0025; H01Q 25/00; H01Q 1/246; H01Q 21/06
See application file for complete search history.

(56) References Cited

U.S. PATENT DOCUMENTS

| | | | |
|---|---|---|---|
| 8,518,537 | B2 | 8/2013 | Matitsine |
| 8,706,049 | B2 | 4/2014 | Choudhury et al. |
| 2004/0252071 | A1 | 12/2004 | Bisiules et al. |
| 2006/0192720 | A1 | 8/2006 | Shtrom |
| 2007/0216596 | A1* | 9/2007 | Lewis .................. H01Q 19/062 343/848 |
| 2008/0048921 | A1 | 2/2008 | Rebeiz et al. |
| 2009/0289864 | A1* | 11/2009 | Derneryd ................ H01Q 1/246 343/758 |
| 2010/0052975 | A1* | 3/2010 | Milano ................ F41G 7/2246 342/175 |
| 2010/0164783 | A1 | 7/2010 | Choudhury et al. |
| 2014/0175893 | A1 | 6/2014 | Sengupta et al. |
| 2015/0070230 | A1 | 3/2015 | Bradley et al. |
| 2015/0091767 | A1 | 4/2015 | Matitsine et al. |
| 2015/0318622 | A1* | 11/2015 | Pruett .................. H01Q 21/061 343/876 |
| 2016/0111793 | A1* | 4/2016 | Montgomery ..... H01Q 21/0006 342/368 |
| 2017/0040705 | A1* | 2/2017 | Matitsine ........... H01Q 21/0031 |
| 2017/0279202 | A1 | 9/2017 | Galla et al. |

FOREIGN PATENT DOCUMENTS

| | | |
|---|---|---|
| CN | 102844673 | 12/2012 |
| EP | 1764868 A1 | 3/2007 |

OTHER PUBLICATIONS

International Search Report and Written Opinion of the International Searching Authority, International Application No. PCT/US2017/025259, dated Jul. 11, 2017, 20 pp.
Shepard, "Argos: Practical Base Stations for Large-scale Beamforming", Master's Thesis, Rice University, Apr. 2012, 52 pp.
Massive MIMO, "Massive MIMO Info Point", downloaded Jul. 26, 2018 from https://massivemimo.eu/, 1 p.
Maltsev et al., "Highly Directional Steerable Antennas", IEEE Vehicular Technology Magazine, vol. 11, No. 1, Mar. 2016, pp. 32-39.
Roh, "Performances and Feasibility of mmWave Beamforming Prototype for 5G Cellular Communications", Presentation at IEEE ICC 2013, Jun. 11, 2013, 29 pp.
Heath, Jr. et al., Millimeter Wave MIMO Precoding/Connbining: Challenges and Potential Solutions, Presentation at IEEE 2014 GLOBECOM, Dec. 8-12, 2014, 25 pp.
Shepard, "Argos: Practical Base Stations for Large-scale Beamforming" (Slides), Master's Thesis, Rice University, Apr. 2012, 46 pp.
Chinese Office Action (English translation only) corresponding to Chinese Application No. 201780013953.6, dated Apr. 8, 2020.

* cited by examiner

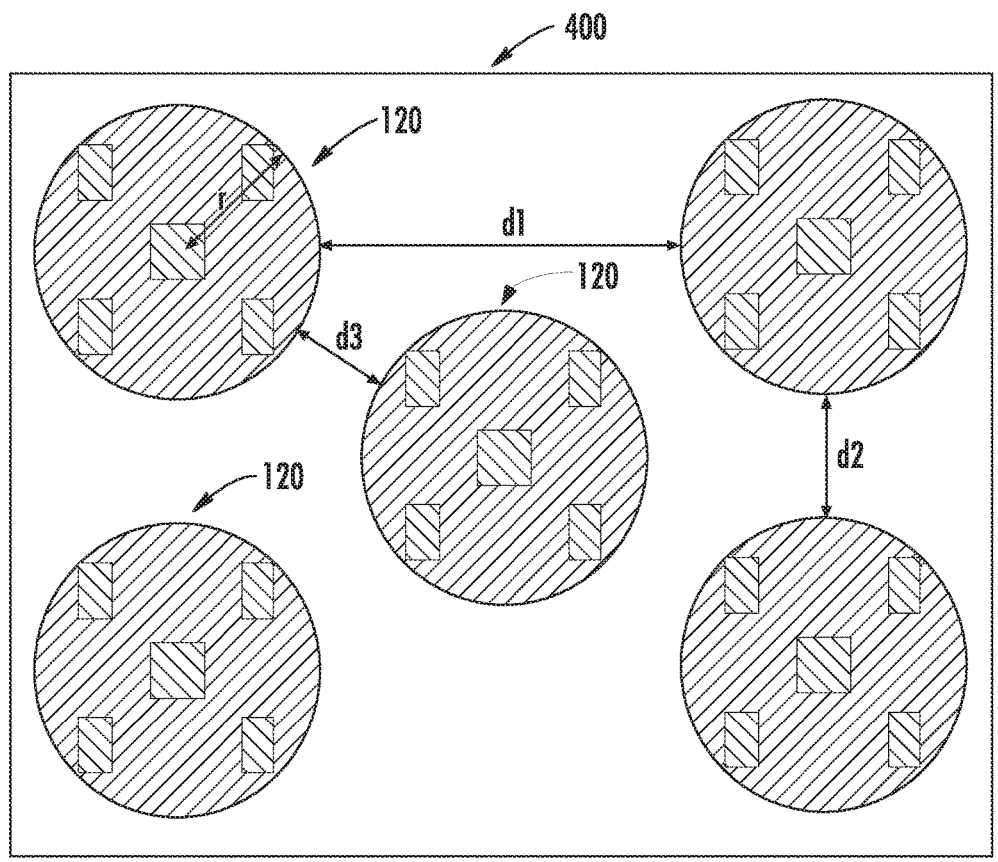
FIG. 7C
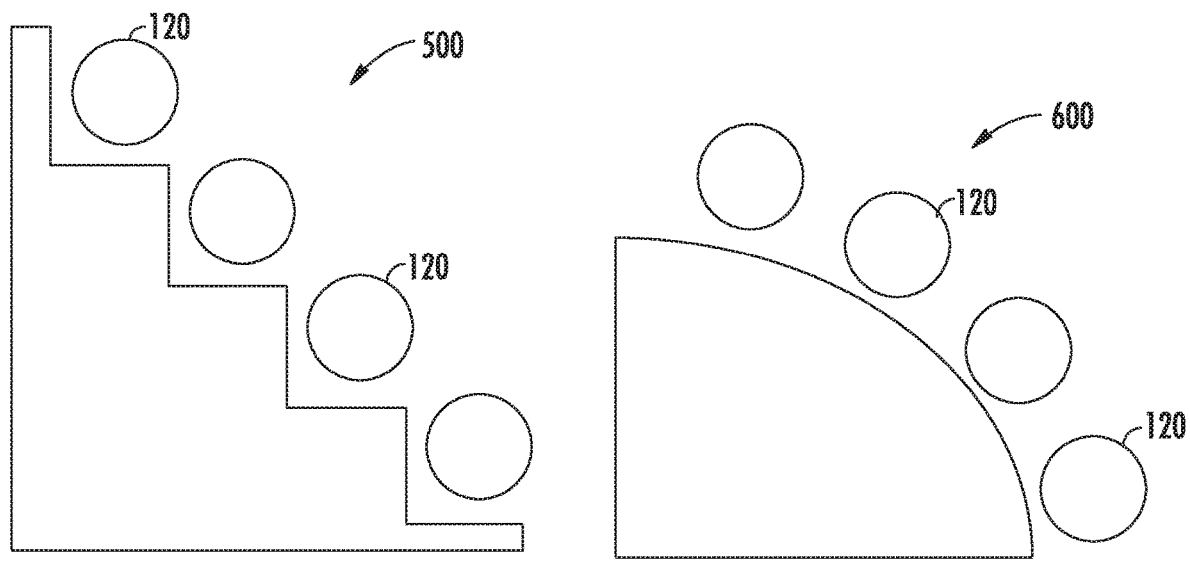
FIG. 8A
FIG. 8B

LENSED ANTENNAS FOR USE IN WIRELESS COMMUNICATIONS SYSTEMS

CROSS-REFERENCE TO RELATED APPLICATIONS

This application is a 35 U.S.C. § 371 national stage application of PCT Application No. PCT/US2017/025259, filed on Mar. 31, 2017, which itself claims priority from and the benefit of U.S. Provisional Patent Application No. 62/315,823, filed Mar. 31, 2016, the disclosures of both of which are hereby incorporated herein in their entireties. The above-referenced PCT Application was published in the English language as International Publication No. WO 2017/173208 A1 on Oct. 5, 2017.

FIELD

The present invention generally relates to communications systems and, more particularly, to antennas that are used in wireless communications systems.

BACKGROUND

A wide variety of wireless communications systems are in use today including, for example, satellite communications systems, radar systems, microwave communications systems, aviation communication systems and cellular communications systems. All of these systems use antennas to transmit and receive the wireless signals.

Antennas can be designed to exhibit directivity, meaning that the antenna may be designed to focus the transmitted signal energy in a certain area/direction and likewise may be designed to focus received signal energy that is incident on the antenna from a certain area/direction. The more directive an antenna is the higher its "gain," which is a measure of the ability of the antenna to focus the transmitted signal energy in a specific direction. The higher the gain of an antenna, the lower the transmit power requirements to achieve a specified level of link performance. The amount of focusing that an antenna provides is often quantified by specifying the half power beamwidth of the antenna in the azimuth (horizontal) and elevation (vertical) directions. In particular, the more an antenna beam is focused, the smaller its azimuth and elevation beamwidths will be, and the higher its gain.

Unfortunately, providing a more focused, higher gain antenna beam typically requires the use of larger antennas. For example, microwave communications systems typically use parabolic reflector antennas, that use a parabolic dish to focus the transmitted (and received) signals. The gain of such antennas increases with the size of the parabolic dish. Likewise, the gain of a phased array antenna will be a function of, among, other things, the aperture size of the phased array. Increasing the size of an antenna may present various problems including increased costs, weight, and wind loading, and in many instances local ordinances may place limits on the sizes of certain types of antennas.

Additionally, the more focused the beam produced by an antenna is smaller azimuth and elevation beamwidths), the less area that, the beam produced by the antenna will cover at any given time. This may raise issues in wireless communications systems having mobile users, as such communications systems typically must provide coverage to any location where the mobile user may be. In some wireless communications systems, phased array antennas are used that may electronically move or "scan" the direction in which the antenna beam points by manipulating the phase of the signals provided to individual radiating elements of the antenna. When such phased array antennas are used, the antenna beam may be scanned as the mobile user moves in order to keep the antenna beam pointed toward the mobile user. Unfortunately, however, as, the antenna beam is electronically scanned, the maximum gain of the antenna beam may be reduced and the antenna beam may become asymmetrical, which is generally undesirable. In addition, when the antenna beam is scanned by relatively large amounts, undesired radiation beams known as grating lobes may be generated that appear well away from the intended direction of the antenna beam. The generation of these grating lobes may reduce the gain of the antenna in the desired direction and may also result in interference with other antenna beams used in the communications system.

Consequently, it may be challenging to provide high gain antenna beams that have good beam characteristics that can be steered over a wide coverage area.

SUMMARY

Pursuant to embodiments of the present invention, array antennas are provided that include a plurality of lensed multi-beam sub-arrays, where each tensed multi-beam sub-array comprises a RF lens and a plurality of radiating elements that are associated with the RP lens and that are orbitally arranged about the RF lens.

In some embodiments, the RF lenses may be arranged in an M×N array having M rows and N columns.

In some embodiments, the radiating elements of each lensed multi-beam sub-array may be located in the same orbital positions.

In some embodiments, each RF lens may comprise a spherical RP lens.

In some embodiments, each radiating element may comprise an active radiating element.

In some embodiments, five radiating elements may be orbitally arranged about each RF lens.

In some embodiments, the plurality of radiating elements that are orbitally arranged about each RF lens may comprise a central radiating element and a plurality of outer radiating elements.

In some embodiments, each radiating element may be positioned at the same distance from its associated RF lens.

In some embodiments, the RF lens may include a dielectric material that comprises a foamed base dielectric material having particles of a high dielectric constant material embedded therein, the high dielectric constant material having a dielectric constant that is at least three times a dielectric constant of the foamed base dielectric material.

In some embodiments, each RF lens may include a dielectric material that comprises a foamed base dielectric material having conductive fibers embedded therein.

In some embodiments, the array antenna may further include a plurality of corporate feed networks. The number of corporate feed networks may be equal to a number of radiating elements included in each lensed multi-beam sub-array. In some embodiments, the array antenna may also include a switching network that may selectively connect a radio to individual ones of the corporate feed networks on a time slot-by-time slot basis, in other embodiments, each corporate feed network may be connected to a respective one of a plurality of radios.

In some embodiments, the array antenna may further include a plurality of electronic phase shifters, where each phase shifter is coupled to a respective one of the radiating elements.

In some embodiments, the radiating elements may be implemented as radio frequency integrated circuit system in package modules. In some embodiments, at least some of the radio frequency integrated circuit system in package modules may include multiple of the radiating elements. In some embodiments, at least one of the radio frequency integrated circuit system in package modules, may include a recess in a surface thereof, and wherein a first of the RF lenses that is part of the a first of the lensed multi-beam sub-arrays is mounted at least partially within the recess. In some embodiments, the radiating elements of the first of the lensed multi-beam sub-arrays may be mounted within the recess.

Pursuant to further embodiments of the present invention, array antennas are provided that include a plurality of lensed multi-beam sub-arrays, each lensed multi-beam sub-array comprising a radio frequency ("RF") lens and a plurality of radiating elements that are associated with the RF lens that are mounted between the RF lens and a mounting structure. Each radiating element is mounted in a different position with respect to its associated RF lens, and each RF lens has its associated radiating elements mounted in the same positions as the other of the RF lenses. These array antennas further include a plurality of corporate feed networks. Each corporate feed network is coupled to one of the radiating elements of each lensed multi-beam sub-array.

In some embodiments, the number of corporate feed networks may be equal to the number of radiating elements included in each lensed multi-beam sub-array.

In some embodiments, a first of the corporate feed networks may be coupled to the radiating elements of each lensed multi-beam sub-array that are mounted in the same positions with respect to their associated RF lens.

In some embodiments, the array antenna may farther include a switching network that selectively connects a radio to individual ones of the corporate feed networks on a time slot-by-time slot basis. In other embodiments, each corporate feed network may be connected to a respective one of a plurality of radios.

In some embodiments, the array antenna may further include a plurality of electronic phase shifters, wherein each phase shifter is coupled to a respective one of the radiating elements.

In some embodiments, each radiating element may be arranged orbitally with respect to its associated RF lens.

In some embodiments, each RF lens may be a spherical RF lens. In some embodiments, each lens may be between 1 and 5 wavelengths of a center frequency of an operating frequency band of the array antenna.

In some embodiments, each RF lens may comprise a lens container that is filled with a dielectric material that has a substantially homogeneous dielectric constant.

Pursuant to further embodiments of the present invention, array antennas are provided that include a plurality of lensed multi-beam sub-arrays, where each lensed multi-beam sub-array includes a radio frequency ("RF") lens and a plurality of radiating elements that are associated with the RF lens. The RF lenses are arranged in a three dimensional arrangement.

In some embodiments, at least some of the RF lens may be arranged in a stair-step pattern.

In some embodiments, at least some of the RF lens may be arranged along a curve.

In some embodiments, a first subset of the RF lenses may be arranged to define a first circle. In some embodiments, a second subset of the RF lenses may be arranged to define a second circle. In some embodiments, the second circle may be disposed above the first circle. In some embodiments, the second subset of the RF lenses may include fewer RF lenses than the first subset of RF lenses.

Pursuant to still further embodiments of the present invention radio frequency integrated circuit system in package modules are provided that include a radio frequency integrated circuit that includes a plurality of radiating elements and a plurality of RF transceivers, where each radiating element is coupled to a respective one of the RF transceivers and an RF lens that is at least partially mounted in a recess in a surface of the radio frequency integrated circuit.

In some embodiments, the RF lens may be a spherical RF lens.

In some embodiments, the radiating elements may be mounted orbitally with respect to the spherical RF lens.

In some embodiments, at least some of the radiating, elements may be mounted on sidewalls of the recess.

BRIEF DESCRIPTION OF THE DRAWINGS

FIGS. 7A-7C are schematic front views of wide-scan phased array antennas according to further embodiments of the present invention.

FIG. 8A is a side-view of a three-dimensional wide-scan antenna according to further embodiments of the present invention.

FIG. 8B is a side-view of a three-dimensional wide-scan antenna according to yet additional embodiments of the present invention.

DETAILED DESCRIPTION

Figure 1:
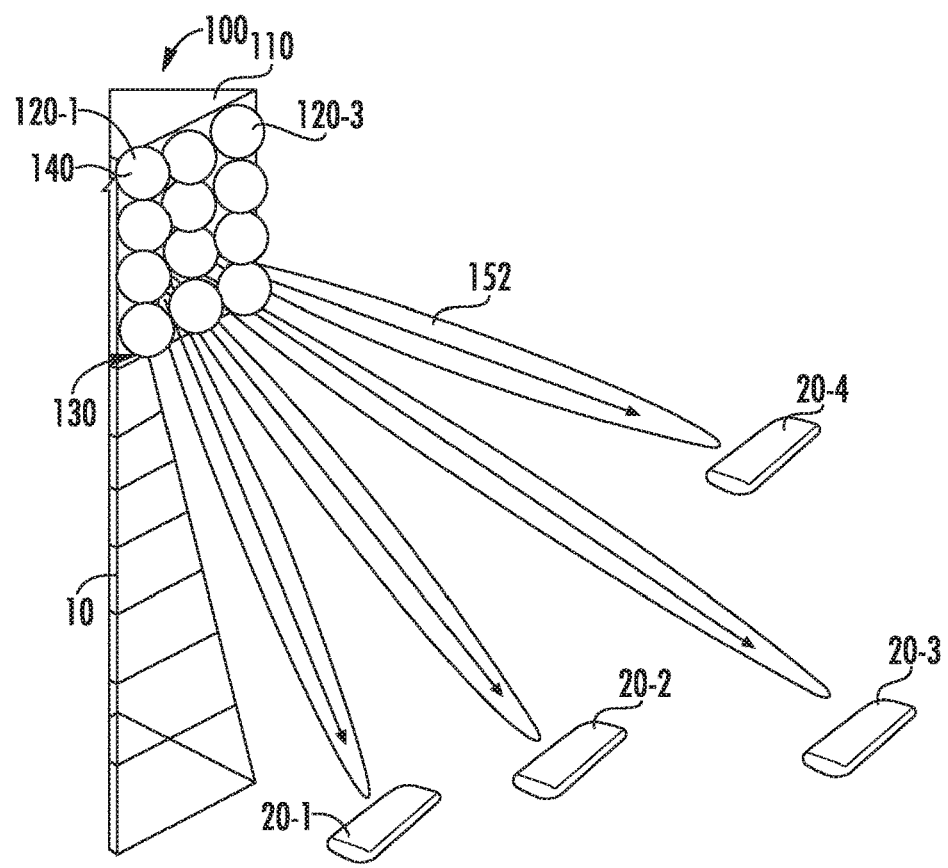
FIG. 1 is a schematic perspective view of a wide-scan phased array antenna according to embodiments of the present invention.

As noted above, it may be challenging to provide high gain antenna beams that have good beam characteristics that can be steered over a wide coverage area, particularly while meeting size and cost constraints for the antenna. One technique that has been suggested for narrowing the beamwidth of a phased array antenna without requiring additional radiating elements is the use of RF lenses. For example, U.S. Patent Publication No. 2015/0070230, ("the '230 publication") discloses using a cylindrical RF lens to narrow the azimuth beamwidth of a base station antenna of a cellular communications system. In particular, the '230 publication discloses a base station antenna that includes three columns of radiating elements that are mounted behind the cylindrical RF lens. Each column of radiating elements is angled with respect to its adjacent column(s) so that each radiating element points toward the central longitudinal axis of the cylindrical RF lens. While each radiating element is designed to have a conventional half power beamwidth of about sixty-five degrees, the cylindrical RF lens narrows the azimuth beamwidth down to about twenty-two degrees. Each column of radiating elements may thus serve a coverage area of about forty degrees in the azimuth direction, in this manner, the base station antenna of the '230 patent may provide three independent beams that each serve one-third of a 120 degree sector of a base station.

While the lensed antenna of the '230 publication has certain advantages, it may not be suitable for many applications. For example, cylindrical RF lenses may generate cross-polarization distortion. As known to those of skill in the art, cross-polarization distortion refers to the amount of energy emitted by a cross-polarized antenna that is transmitted at the orthogonal polarization. If the amount of cross-polarization distortion is significant, cylindrical RF lenses may be unsuitable for use in applications where signals are transmitted at orthogonal polarizations. As another example, cylindrical RF lenses only narrow the beamwidth in one direction (typically the azimuth direction), and hence may not be suitable in applications where beam narrowing in both the azimuth and elevation directions is necessary. Additionally, the antenna of the '230 publication only produces small sector antenna beams, and hence is not suitable for applications where very narrow "pencil" antenna beams are pointed directly toward specific users.

Pursuant to embodiments of the present invention, widescan antennas are provided that include a plurality of lensed multi-beam sub-arrays. In some embodiments, the lensed multi-beam sub-arrays may be arranged in an array such as, for example, an M×N array having M rows and N columns.

Each lensed multi-beam sub-array may comprise a plurality of radiating elements that are mounted around one side of an RF lens. The RF lens may be a spherical RF lens and may have a diameter that is, for example, on the order of 1-5 wavelengths of the RF signals that are to be transmitted therethrough. Each spherical RF lens may be formed of a dielectric material that exhibits a relatively uniform dielectric constant. RF lenses having other shapes may also be used in other embodiments as may RF lenses formed with dielectric materials having non-uniform dielectric constants. The spherical RF lenses may focus the RF signals emitted by their associated radiating elements in both the azimuth and elevation directions. The focusing achievable by the spherical RF lenses combined with the focusing achievable by amplitude and/or phase weighting of the signals transmitted through different combinations of the radiating elements allows the wide-scan array to form a plurality of narrow "pencil" antenna beams that may be pointed directly at users (or other targets) throughout the coverage area. In some embodiments, the radiating elements may be cross-polarized radiating elements.

Each radiating element in a lensed multi-beam sub-array may be "orbitally" arranged with respect to its associated spherical RF lens in that each radiating element may be spaced-apart from its associated RF lens by the same distance and may be pointed at the center of its associated spherical RF lens. The radiating elements in each sub array may be spaced apart from each other by pre-selected amounts so that each radiating, element in a particular lensed multi-beam sub-array points in a different direction. In one example embodiment, a "central" radiating element may be positioned on a plane running through the center of the spherical RF tens that is parallel to the horizon, and four "outer" radiating elements may be offset by about 25-50 degrees in both the azimuth and elevation directions from the central radiating element. Thus, the outer radiating elements are disposed in four quadrants that surround the central radiating element. In a specific example embodiment, each of the four outer radiating elements may be offset by 40 degrees in both the azimuth and elevation directions from the central radiating element. Applying the familiar longitude and latitude lines that are on a globe to the spherical RF lens, in the above-described example embodiment, the five radiating elements would be positioned above the following longitude and latitude coordinates on the spherical RF lens (where radiating element 5 is the central radiating element) on the spherical RF lens, with each of the five radiating elements pointing toward the center of the spherical RF lens and at the same distance from the spherical RF lens:

Radiating element 1: −40° longitude, 40° latitude;
Radiating element 2: 40° longitude, 40° latitude;
Radiating element 3: 40° longitude, −40° latitude;
Radiating element 4: −40° longitude, −40° latitude; and
Radiating element 5: 0° longitude, 0° latitude.

Each lensed multi-beam sub-array may have the same design. As such, the wide-scan antenna of the above embodiment may be viewed as five separate phased array antennas that have M×N radiating elements pointing in each of five different directions or "coverage areas." For example, if the antenna comprises a 4×3 array of lensed multi-beam sub-arrays, the antenna will include sixty radiating elements that are divided into five groups of twelve radiating elements each, with the twelve radiating elements in each group all pointing in a respective one of five different directions. Each group of M×N radiating elements (i.e., one radiating element per lensed multi-beam sub-array) may be used to generate one or more antenna beams in their respective coverage areas.

In some embodiments, each of the radiating elements may comprise an active radiating element having an associated transceiver connected directly thereto. The wide-scan antennas according to embodiments of the present invention may be used to generate a plurality of narrow "pencil" beams that can be pointed directly at users within the coverage area of the antenna, thereby providing high gain and allowing for the efficient use of spectrum. Additionally, because the radiating elements are divided into five groups of radiating elements that are physically pointed in multiple different directions throughout the coverage area for the wide-scan antenna due to their orbital placement around their associated spherical RF lenses, the wide-scan antenna will exhibit significantly less gain loss, beam distortion and grating lobe generation when scanned to cover different regions of the overall coverage area for the antenna than would conventional phased array antennas.

In particular, when an RF signal is distributed to a sub-group of radiating elements that each has the same orientation on an M×N set of lensed multi-beam sub-arrays, and the RF signals that are provided to these radiating elements are in-phase, the radiating elements will form a coherent antenna beam. This antenna beam will be the product of the array factor and the lensed radiating element pattern and will have a coincident peak direction, and thus its peak gain is in that direction. In the case of wide-scan antenna that has lensed multi-beam sub-arrays that each include five radiating elements, the antenna will generate five orthogonal antenna beams that point in different directions, and thus each antenna beam will have its peak gain in a different direction. These antenna beams can be scanned and shaped using standard amplitude and phase variation of each component of the signal applied to the antenna.

In other embodiments, a switching network may be provided and the wide-scan antenna may implement a time division multiplexing scheme by forming different antenna beams for each time, slot thereof. In still other embodiments, the radiating elements may be fed by a switched corporate feed network that selectively supplies signals from a radio to groups of one or more of the radiating elements during the time slots of a time division multiplexing communication scheme. The switched corporate feed network may be switched at high speeds so as to direct the signal to be transmitted during any particular time slot to the radiating elements that provide coverage to portions of the coverage area that include users who transmit/receive signals during that particular time slot. During the next time slot, the switch network, may be reconfigured to selectively supply the signal from the radio to a different subset of the radiating elements that provide coverage to portions of the coverage area that include users who transmit/receive signals during this subsequent time slot. The antenna beams are only activated when a user is within the coverage area. In still further embodiments, the radiating elements may be fed by a switched corporate feed network without the use of a time division multiplexing scheme.

Embodiments of the present invention will now be discussed in further detail with reference to the figures, in which example embodiments of the invention are shown.

FIG. 1 is a schematic perspective view of a wide-scan antenna 100 according to certain embodiments of the present invention.

As shown in FIG. 1, the wide-scan antenna 100 includes a mounting structure 110 that has a plurality of lensed multi-beam sub-arrays 120 mounted thereon. The mounting structure 110 may comprise a unitary structure or may comprise a plurality of structures that are attached together. The mounting structure 110 may house various components of the wide-scan antenna 100 such as, for example, transceivers, diplexers, connectors, cables, etc. In some embodiments, the lensed multi-beam sub-arrays 120 may be arranged in an M×N array, where M is the number of rows and N is the number of columns. In other embodiments, the lensed multi-beam sub arrays 120 may be arranged in other patterns such as, for example, an "X" shape.

Each lensed multi-beam sub array 120 may include a plurality of radiating elements 130 and an associated RF lens 140. The radiating elements 130 and/or the RF lens 140 may be mounted on the mounting structure 110. The radiating elements 130 may generally be positioned between the mounting structure 110 and the RF lens 140. The RF lenses 140 may be used to narrow the beamwidths of the antenna beams of the individual radiating elements 130. As is schematically shown in FIG. 1, the wide-scan antenna 100 may be configured to generate a plurality of "pencil beam" antenna beams 152 that provide high directivity to selected locations within a field of view of the wide-scan antenna 100. These pencil beams 152 may have high gain, little or no beam distortion, and may not generate grating lobes. The wide-scan antenna 100 may be configured so that the pencil beams 152 may be pointed directly at individual users 20 (four such users 20-1 through 20-4 are schematically illustrated in FIG. 1).

The wide-scan antenna 100 may be mounted on a tower 10 or other raised structure in some embodiments. When the wide-scan antenna 100 is mounted for use, the azimuth plane may be perpendicular to the longitudinal axis of the wide-scan antenna 100, and the elevation plane may be parallel to the longitudinal axis of the wide-scan antenna 100.

In the particular embodiment depicted in FIG. 1, the wide-scan antenna 100 includes a total of twelve lensed multi-beam sub-arrays 120 (only two of the lensed multi-beam sub-arrays 120, namely sub-arrays 120-1 and 120-3, are numbered in FIG. 1). Each lensed multi-beam sub-array 120 comprises one of the RF lenses 140 and a plurality of radiating elements 130 that are configured to transmit and receive signals through that RF lens 140. Different numbers of lensed multi-beam sub-arrays 120 may be used in different embodiments. In the depicted embodiment, each lensed multi-beam, sub-array 120 includes one RF lens 140 and five radiating elements 130, although different numbers of radiating elements 130 could be used in different embodiments. It will also be apparent that all of the lensed multi-beam sub-arrays 120 need not have the same number of associated radiating elements 130.

Figure 2A:
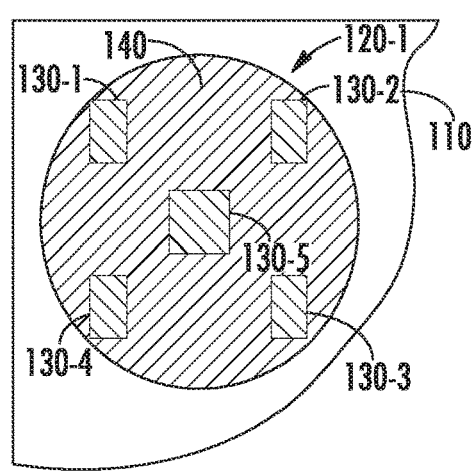
FIG. 2A is a schematic front view of a lensed multi-beam sub-array of the wide-scan antenna of FIG. 1.
Figure 2B:
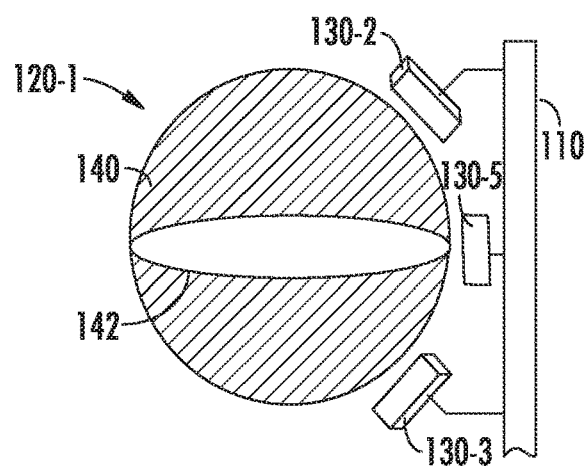
FIG. 2B is a schematic side view of the lensed multi-beam sub-array of FIG. 3A.

FIGS. 2A and 2B schematically illustrate one of the lensed multi-beam sub-arrays 120 (120-1) of the wide-scan antenna 100 of FIG. 1. In particular, FIG. 2A is a schematic front view of the lensed multi-beam sub-array 120-1 and FIG. 28 is a schematic side view of the lensed multi-beam sub-array 120-1. Note that in FIG. 2A the five radiating elements 130 are positioned behind the RF lens 140 and hence it will be appreciated that the RF lens is shown in a "transparent" view in FIG. 2A so that the radiating elements 130 that are positioned behind the RF lens 140 can be seen in the drawing. Likewise, it will be appreciated that in FIG. 2B radiating elements 130-1 and 130-4 are not pictured as they are located directly behind radiating elements 130-2 and 130-3, respectively, and hence are not visible in the side view of FIG. 28.

As shown in FIGS. 2A and 2B, each lensed multi-beam sub-array 120 includes five radiating elements 130 that are mounted around one side of the RF lens 140 that is included in the sub-array 120. The RF lens 140 is a spherically shaped or "spherical" RF lens 140. Additional details regarding the composition, fabrication and performance attributes of the spherical RF lenses 140 are provided below. Each radiating element 130 may be positioned with respect to its associated spherical RF lens 140 so that a center and/or peak amplitude of a radiation pattern that is emitted by the radiating element 130, when excited, is directed at a center point of its associated spherical RF lens 140. Each radiating element 130 may be positioned at the same distance from its associated spherical RF lens 140 as are the other four radiating elements 130 that are associated with the spherical RF lenses 140. Moreover, each sub-array 120 may be identical so that all of the radiating elements 130 point at the center of their associated spherical RF lenses 140 and are the same distance from their associated spherical RF lenses 140. The above-described arrangement where the radiating elements 130 are positioned to point toward the center of their respective RF lens is referred to herein as an "orbital" arrangement. In particular, herein, a radiating element 130 is arranged "orbitally" with respect to a spherical RF lens 140 when the radiating element 130 is pointed toward the center of the spherical RF lens 140. A radiating element 130 is considered to be pointing in the direction at which the maximum amount of RF energy is emitted when the radiating element 130 is excited by a signal in its frequency band of operation.

As shown in FIGS. 2A-2B, in one embodiment, four radiating elements 130 may be orbitally arranged in a "box" configuration and a fifth radiating element 130 may be orbitally arranged in the center of the box. Herein the four radiating elements 130 that form the box may be referred to as the outer radiating elements 130 and the fifth radiating element 130 that is arranged in the center of the box may be referred to as the central radiating element 130. As can be seen in the side view of FIG. 2B, in this arrangement the four outer radiating elements 130 may be located forwardly of the central radiating element 130 (i.e., further away from the mounting structure 110) so that each radiating element 130 may be orbitally arranged about the spherical RF lens 140. In the depicted embodiment, each outer radiating element 130 is located at a position that is offset by about 40 degrees in both the azimuth and elevation direction from the location of the central radiating element 130. For example, if the central radiating element 130 is pointed at a location on the spherical RF lens having an azimuth and elevation angle of (0, 0), then the four outer radiating elements 130 would have azimuth and elevation angles of (40, 40), (−40, 40), (40, −40) and (−40, −40), in other embodiments, each outer radiating element 130 may be located at a position that is offset by between about 20 degrees and about 60 degrees in the azimuth and elevation direction front the location of the central radiating element 130. The offsets in the azimuth and elevation directions may be different (e.g., offset by 25 degrees in the elevation direction and offset by 40 degrees in the azimuth direction) in some embodiments.

As shown in FIGS. 2A-2B, this orbital arrangement may be achieved by positioning at least some of the radiating elements 130 forwardly and/or above or below a central horizontal or "equatorial" plane 142 of the spherical RF lenses 140. As a result, the radiating elements 130 are not arranged in a planar fashion as is conventional, but instead are arranged in arcs about their respective RF spherical lenses 140. This arrangement may provide a variety of performance improvements as will be described in greater detail below.

In order to orbitally mount the radiating elements 130, it may be necessary to angle at least some of the radiating elements 130 with respect to a vertical axis. As will be discussed in greater detail below with reference to FIGS. 3A-3B, when dipole, cross-dipole or patch radiating elements 130 are used, each radiating element 130 will typically include a radiator 132 (e.g., one or more dipoles), feed stalks 134 and aground plane 136. The feed stalks 134 are used to mount the radiator 132 at a desired distance in front of the ground plane 136 (e.g., a distance corresponding to one quarter of the wavelength of the signals that are to be transmitted through the wide-scan antenna 100). In conventional phased array antennas, the ground, plane is typically a planar, vertically-oriented sheet of metal that serves as the ground plane for all of the radiating elements, and the feed stalks extend from the ground plane at a 90 degree angle (i.e., horizontally). In the wide-scan antenna 100, some of the radiating elements 130 may be angled upwardly or downwardly and/or to the left or right due to their orbital arrangement about their respective spherical RF lenses 140. As such, in some embodiments, each radiating element 130 may have its own individual ground plane 136, and the feed stalk 134 of each radiating element 130 may extend outwardly from the ground plane 136 at an angle of substantially 90 degrees toward the spherical RF lens 140 that is associated with the radiating element 130.

Figure 3A:
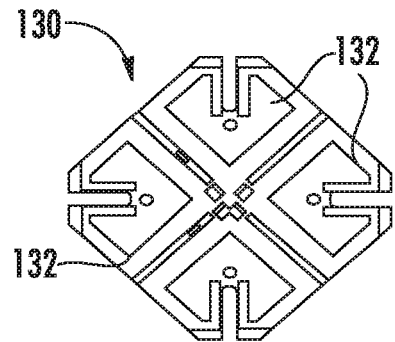
FIG. 3A is a plan view of an example dual polarized radiating element that may be used in the wide-scan antenna of FIG. 1.
Figure 3B:
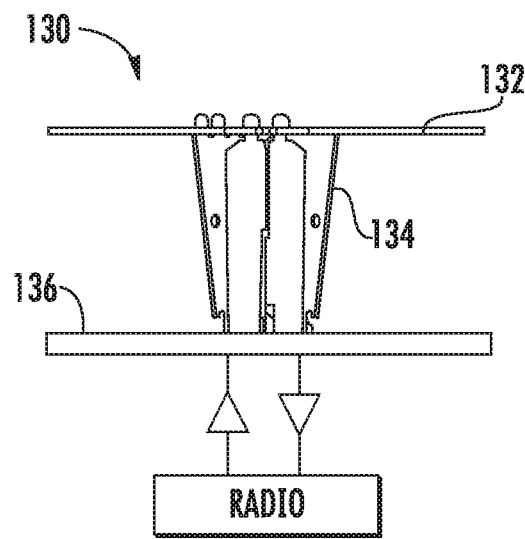
FIG. 3B is a side view of the example dual polarized radiating element of FIG. 3A.

The radiating elements 130 are illustrated schematically in FIGS. 1 and 2A-2B. Each radiating element 130 may comprise, for example, a dipole, a patch, a horn, open-ended waveguide or any other appropriate radiating element. FIGS. 3A-3B illustrate an example implementation of a radiating element 130. In particular, FIG. 3A is a plan view of the example radiating elements 130, and FIG. 3B is a side view thereof. In the example embodiment shown, the radiating element 130 comprises a pair of cross-polarized radiating elements, where one radiating element of the pair radiates RF energy with a +45° polarization and the other radiating element of the pair radiates RF energy with a −45° polarization.

As shown in FIG. 3A, the example radiating element 130 includes four dipoles 132 that are arranged in a square or "box" arrangement. The four dipoles 132 are supported by feed stalks 134, as illustrated in FIG. 3B. Each radiating element 130 includes two linear orthogonal polarizations (slant +45°/−45°. Each radiating element 130 may also include a ground plane 136 that is positioned behind the dipoles 132 so that, for example, the dipoles 132 are adjacent one end of the feed stalks 134 and the ground plane 136 is adjacent the other end of the feed stalks 134.

It will be appreciated that the radiating element 130 discussed above simply represents one example of a suitable radiating element for the wide scan antenna 100, and that numerous other types of radiating elements 130 could be used. For example, in other embodiments patch radiating elements, single dipole (as opposed to cross-polarized pairs of dipoles) radiating elements or horn radiating elements could be used. A wide variety of dipole, cross-dipole, horn and patch radiating elements are known in the art and the particular type of radiating element used may be selected based on the application, cost and various other factors. It will also be appreciated that radiating elements other than dipole, cross-dipole, horn and patch radiating elements may be used in other embodiments.

It will also be appreciated that multiple different types of radiating elements 130 may be used in some embodiments. For example, in certain applications, such as cellular communications, it may be advantageous if the wide-scan antenna 100 may communicate in multiple different frequency bands (e.g., to support multiple different types of cellular service such as GSM900 and GSM1800 service or any other combination of cellular services). In a particular embodiment, the radiating elements 130 may be implemented as box radiating elements that are configured to radiate in different frequency bands, interleaved with each other as shown in U.S. Pat. No. 7,405,710 ("the '710 patent"), the entire content of which is incorporated herein by reference. As shown in the '710 patent, the dual-frequency box radiating elements may comprise a first array of box-type dipole radiating elements that are coaxially disposed within a second box-type dipole assembly. The use of such radiating elements may allow a lensed antenna to operate in two frequency bands (for example, 0.79-0.96 GHz and 1.7-2.7 GHz). For the antenna to provide similar beamwidths in both frequency bands, the high band radiating elements may have directors. In this case, a low band radiating element may have, for example, a HPBW in the azimuth direction of 65-50°, and a high band radiating element may have a HPBW in the azimuth direction of 45-35°, The spherical RF lens 140 used in conjunction with these radiating elements 130 may be used to reduce these beamwidths a desired amount to obtain the pencil beams 152 illustrated in FIG. 1. The spherical RF lens 140 will shrink the beamwidth of the high band radiating elements more than the low band radiating element so that the radiating elements may be designed to have similar beamwidths in both the azimuth and elevation directions.

As noted above, in some embodiments, each radiating element 130 may comprise an active radiating element in that the radiating element 130 is directly fed by a dedicated transceiver (radio), as opposed to having each sub-group of radiating elements 130 that have the same orientation on their respective lensed multi-beam sub-array 120 fed by a passive corporate feed network. Such an active radiating element is schematically shown in FIG. 3B. The use of active radiating elements allows the amplitude and phase of the RF signals that are transmitted through each radiating element 130 to be manipulated digitally prior to transmission. By using digitally introduced amplitude and/or phase weighting, each active radiating element may be configured to, either by itself or in conjunction with other of the active radiating elements, generate a coherent, narrow beam that can be actively directed to locations where users are present. As will be explained in further detail herein, the use of narrow beams that are actively directed at users can provide high antenna gains (reducing transmit power requirements) and more efficient spectrum use since the narrow beams allow for frequency reuse within the coverage area of the antenna. Alternatively, the active electronics feeding each radiating element can apply amplitude and phase weighting to the signals radiated through the radiating elements in response to channel conditions in order to maximize the signal or signal-to-noise level for a particular user that may not result in a set of coherent narrow beams. In both cases, since this is digital beamforming in the baseband the weights can be varied for various segments of the baseband spectrum. In other embodiments, each radiating element 130 may instead be fed by a corporate feed network that, for example, connects a plurality of different radiating elements 130 to the same radio.

Referring again to FIGS. 1 and 2A-2B, the wide-scan antenna 100 further includes a plurality of spherical RF lenses 140. In the particular embodiment depicted in FIGS. 1 and 2A-2B, five of the radiating elements 130 are associated with each spherical RF lens 140. The spherical RF lens 140 may narrow the beamwidth of the RF energy radiated by each of its associated radiating elements 130 in both the azimuth and elevation directions. The amount of narrowing that occurs is a function of several factors including the frequency of the RF signal, the diameter of the spherical (or other shaped) RF lens 140 and the dielectric constant of the material used to form the lens 140. In example embodiments, the diameter of each spherical RF lens 140 may be on the order of 1-5 wavelengths of the RF signals that are transmitted through the RF lens 140. Such lenses may exhibit the functionality of a Luneburg lens (which is a lens filled with concentric layers of dielectric materials having different dielectric constants), but may achieve this functionality using a single dielectric material. In some example embodiments, the spherical RF lens 140 may include (e.g., be filled with or consist of) a material having a dielectric constant of about to about 3. The dielectric material of the spherical RF lens 140 focuses the RF energy that radiates from, and is received by, the radiating elements 130. While a spherical RF lens 140 having a homogenous dielectric constant is illustrated in the example embodiment above, it will be appreciated that in other embodiments, non-spherical lens may be used and/or lens that have a non-homogenous dielectric constant.

A spherical shell filled with particles of the artificial dielectric material described in U.S. Pat. No. 8,518,537 (incorporated herein by reference) may be used to form the spherical Rh lenses 140 in some embodiments. In such embodiments, each particle may comprise a small block of the dielectric material that includes at least one needle-like (or other shaped) conductive fiber embedded therein. The small blocks may be formed into a larger structure using an adhesive that glues the blocks together. The blocks may have a random orientation within the larger structure. The base dielectric material used to form the blocks may be a lightweight material having a density in the range of, for example, 0.005 to 0.1 g/cm$^3$. By varying, the number and/or orientation of the conductive fiber(s) that are included inside the small blocks, the dielectric constant of the material can be varied from, for example, about 1 to about 3.

In other embodiments, a spherical RF lens 140 may be a shell filled with a composite dielectric material that comprises a mixture of a high dielectric constant material and a light weight low dielectric constant base dielectric material. For example, the composite dielectric material may comprise a large block of foamed base dielectric material that includes particles (e.g., a powder) of a high dielectric constant material embedded therein. The lightweight, low dielectric constant base dielectric material may comprise, for example, a foamed plastic material such as polyethylene, polystyrene, polytetrafluoroethylene (PTEF), polypropylene, polyurethane silicon or the like that has a plurality of particles of a high dielectric constant material embedded therein. In some embodiments, the foamed lightweight low dielectric constant base dielectric material may have a foaming percentage of at least 50%.

The high dielectric constant material may comprise, for example, small particles of a non-conductive, material such as, for example, a ceramic (e.g., $Mg_2TiO_4$, $MgTiO_3$, $CaTiO_3$, $BaTi_4O_9$, boron nitride or the like) or a non-conductive (or low conductivity) metal oxide (e.g., titanium oxide, aluminium oxide or the like). In some embodiments, the high dielectric constant material may have a dielectric constant of at least 10. The high dielectric constant material may comprise a powder of very fine particles in some embodiments. The particles of high dielectric constant material may be generally uniformly distributed throughout the base dielectric material and may be randomly oriented within the base dielectric material. In other embodiments, the composite dielectric material may comprise a plurality of small blocks of a base dielectric material, where each block has particles of a high dielectric constant dielectric material embedded therein and/or thereon. In some embodiments, the small blocks may be adhered together using, for example, an adhesive such as rubber adhesives or adhesives consisting of polyurethane, epoxy or the like, which are relatively lightweight and which exhibit low dielectric losses.

In some embodiments, the spherical RF lenses 140 may comprise blocks or other small particles of a dielectric material that is contained within an outer shell that has a desired shape for the RF lens (e.g., spherical shaped). In such embodiments, an adhesive may or may not be used to adhere the blocks together. Antennas may be subject to vibration or other movement as a result of wind, rain, earthquakes and other environmental factors. Such movement can cause settling of the above-described blocks of dielectric material particularly if an adhesive is not used. In some embodiments the shell may include a plurality of individual compartments and the blocks may be filled into these individual compartments to reduce the effects of settling. The use of such compartments may increase the long term physical stability and performance of a lens. It will also be appreciated that the blocks may also and/or alternatively be stabilized with slight compression and/or a backfill material. Different techniques may be applied to different compartments or all compartments may be stabilized using the same technique.

In still other embodiments, the dielectric material may be any of the dielectric materials disclosed in U.S. Provisional Patent Application Ser. No. 62/313,406, filed Mar. 25, 2016 and/or U.S. patent application Ser. No. 15/464,442, filed Mar. 21, 2017, the entire content of each of which is incorporated herein by reference.

One advantage of phased array antennas that comprise an array of radiating elements is that the array can be scanned off of boresight by adjusting the phase of the signals that are supplied to the individual radiating elements. Herein the boresight direction refers to the direction at which the beam of the phased array antenna achieves peak, amplitude when the radiating elements are all fed a signal having the same phase. Typically, the boresight direction is coincident with a vector that extends perpendicularly from the center of a plane defined by the array of radiating elements and/or from a center of a plane defined by the array of spherical RF lenses.

Figure 4A:
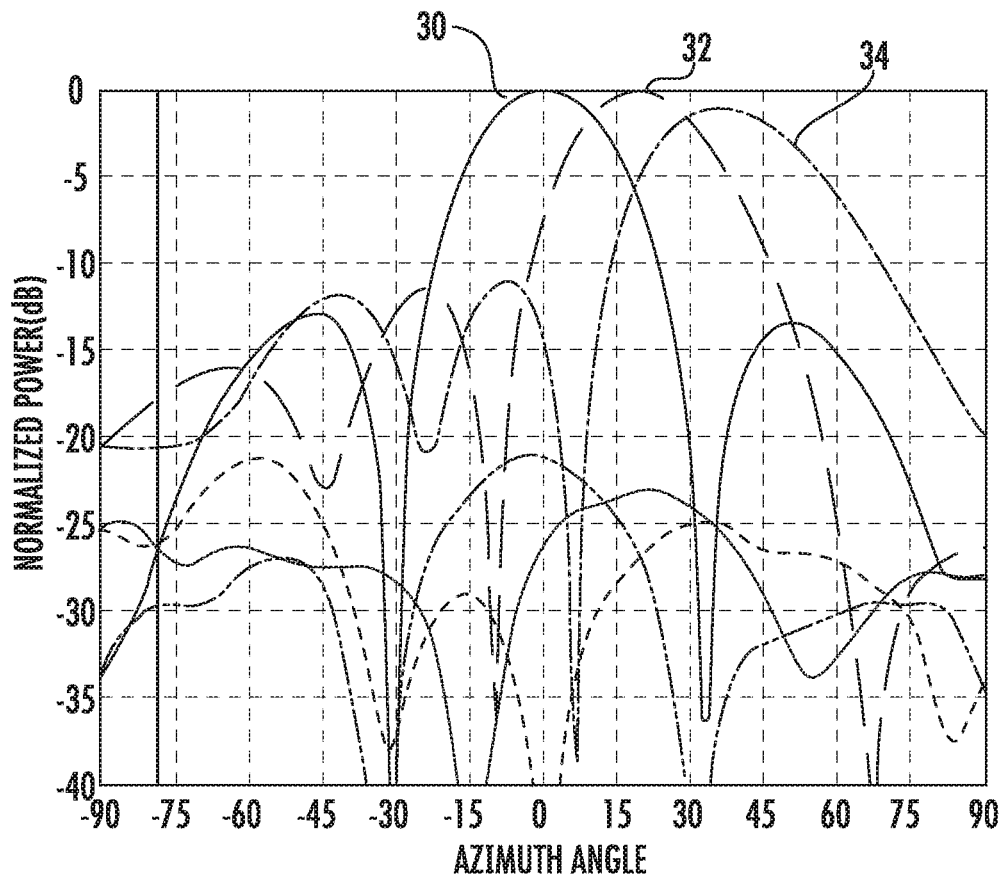
FIG. 4A is a graph that illustrates the normalized power of an RF signal that is transmitted through an example conventional phased array antenna as it is steered off boresight in the azimuth direction.
Figure 4B:
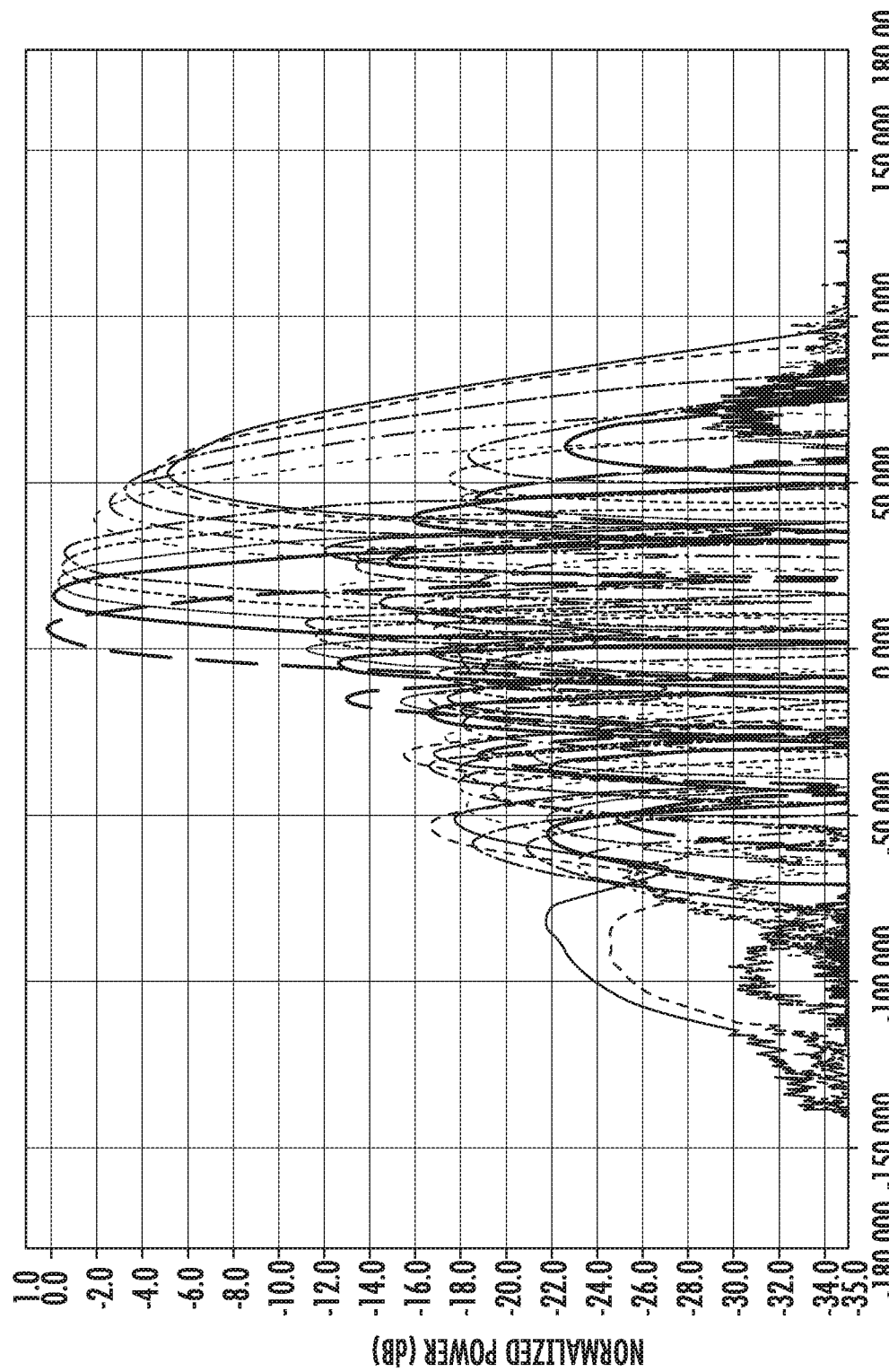
FIG. 4B is a graph that illustrates the normalized power of an RF signal that is transmitted through another example of a conventional phased array antenna as it is steered off boresight in the azimuth direction.

While the ability to scan a phased array antenna off boresight may be a distinct advantage, the antenna beam tends to degrade the further the beam is scanned off boresight. This is shown pictorially with reference to FIGS. 4A and 4B, which are graphs that illustrates the normalized power of an RF signal transmitted through two example conventional phased array antennas as the antennas are electronically steered off boresight the azimuth direction. In FIG. 4A, curve 30 illustrates the normalized power of the RF signal (in dB, normalized to peak power) as a function of azimuth angle when no beam steering is performed, while curves 32 and 34 illustrate the normalized power of the RF signal as a function of azimuth angle when the beam is steered 20 degrees and 40 degrees, respectively, in the azimuth direction. As can be seen from FIG. 4A, when the beam is not steered (curve 30), the antenna has a normalized power of 0 dB and the pattern exhibits good symmetry (i.e., the gain is approximately same at x and −x degrees in the azimuth direction). However, as the beam is steered (curves 32 and 34), the normalized power starts to drop off (e.g., by about 2 dB at 40 degrees, which is significant), and the symmetry of the beam pattern is degraded. The more the beam is steered, the greater these effects become. These same effects can be seen in the graph of FIG. 4B. In FIG. 4B, the antenna beam is electronically steered from 0 degrees to 60 degrees, and FIG. 4B clearly illustrates how the drop off in gain becomes dramatic at high steering angles. Additionally, as can also be seen in FIG. 4B, grating lobes start to appear in directions that are far from the intended direction of the antenna beam at an azimuth angle of about −90 degrees) when the antenna is steered more than, for example, 30-40 degrees off boresight. Thus, while phased array antennas have beam scanning capabilities, unfortunately, the performance of the array degrades when such off boresight scanning capabilities are used.

The wide scan antennas according to embodiments of the present invention may significantly reduce the above-described limitations with conventional phased array antennas. In particular, the wide-scan antennas disclosed herein may have radiating elements 130 that point in each of a fixed number of different directions. For example, with the wide-scan antenna 100 of FIGS. 1-28, the radiating elements 130 are effectively divided into five sub-groups, with each sub-group comprising the radiating elements 130 that point in a particular direction. Specifically, referring to FIG. 2A, the radiating element 130-1 in each lensed multi-beam sub-array 120 belongs to the first sub-group, the radiating element 130-2 in each lensed multi-beam sub-array 120 belongs to the second sub-group, etc. Thus, each sub-group includes twelve radiating elements 130, and the radiating elements 130 in each sub-group all point in the same direction, in other words, the wide-scan antenna 100 has five sub-groups of twelve radiating elements 130 each, where the radiating elements 130 of each sub-group point in a respective one of five different directions. In this particular embodiment, the twelve radiating elements 130 in the fifth sub-group are pointed along the mechanical boresight direction of the wide-scan antenna 100 and may be used to provide coverage to users (or other targets) that are located, for example, within a central region that is within about +/−20 degrees azimuth and +/−20 degrees elevation of boresight. The remaining four sub-groups of radiating elements 130 are used to serve users (or other targets) that are located in four respective regions that surround the central region.

Figure 5A:
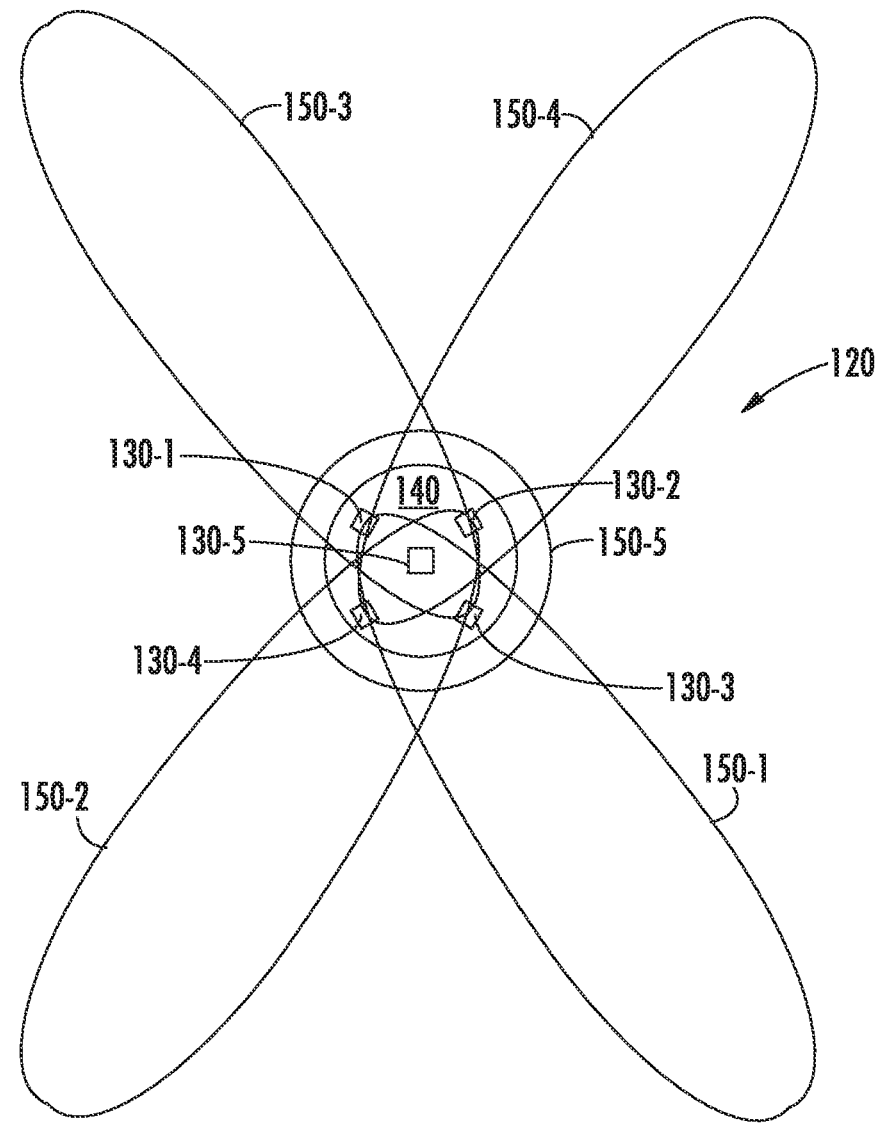
FIG. 5A is a schematic rear view of one of the lensed multi-beam sub-arrays of the wide-scan antenna of FIG. 1 that illustrates the five orthogonal antenna beams that can be generated by the sub-array when the antenna beams are not electronically steered.
Figure 5B:
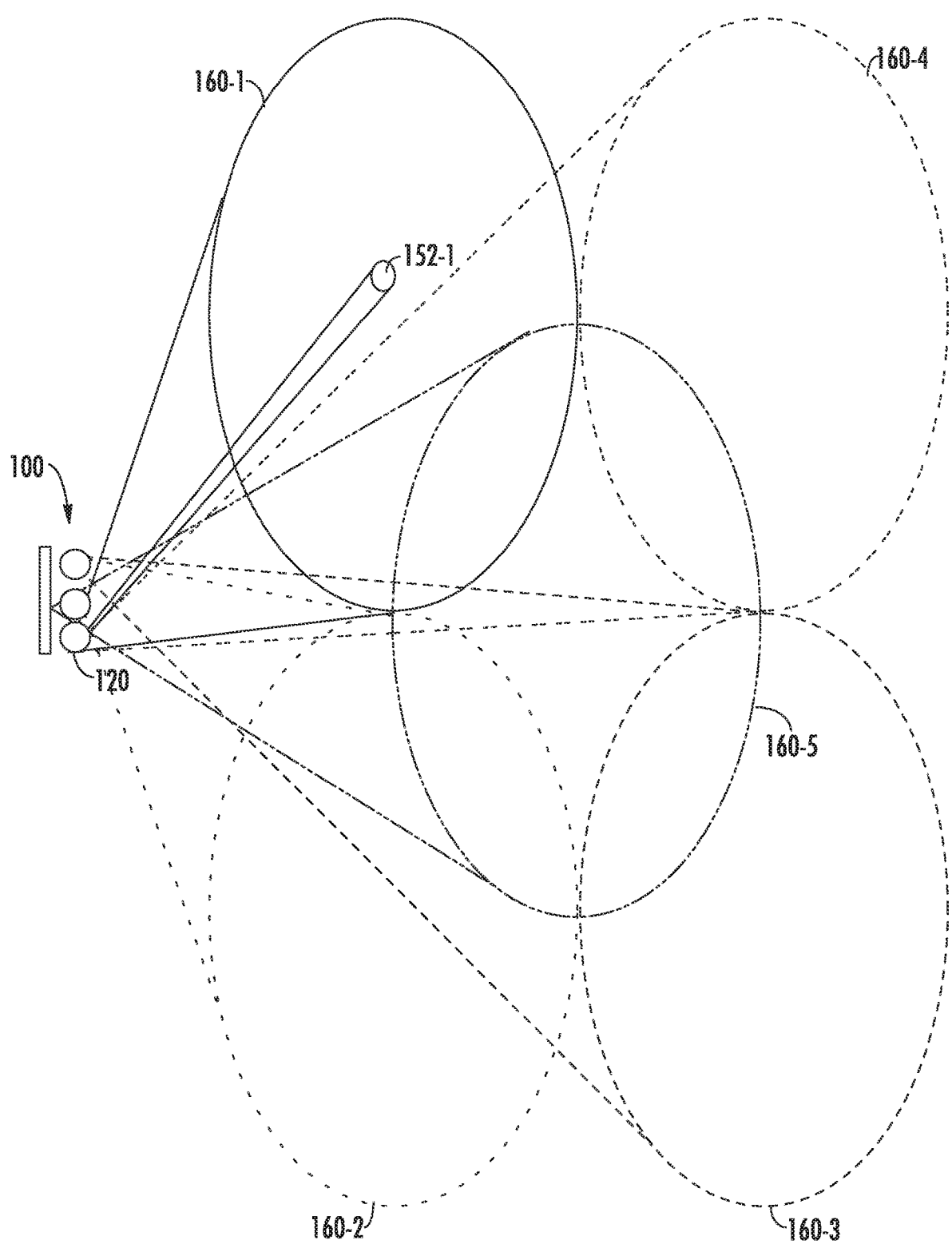
FIG. 5B is a schematic plan view of the primary coverage areas for each of the five radiating elements included in one of the lensed multi-beam sub-arrays of the wide-scan antenna of FIG. 1.

FIGS. 5A and 5B illustrate the antenna beams 152 that may be generated by the wide-scan antenna 100 and the region or "coverage area" over which these antenna beams 152 may be electronically steered to provide service to users 20.

In particular, FIG. 5A is a schematic rear view of one of the lensed multi-beam sub-arrays 120 of the wide-scan antenna 100 of FIG. 1. As shown in FIG. 5A, the sub-array 120 may be used to generate five orthogonal antenna beams 150-1 through 150-5. As can be seen in FIG. 5A, each antenna beam 150 will point in the same direction as the radiating element 130 that is used to generate the antenna beam 150. Accordingly, for the wide-scan antenna 100 beam 150-5 will point in the mechanical boresight direction of the antenna 100 and the remaining beams 150-1 through 150-4 will point in the following four (azimuth, elevation) directions:

Beam 150-4—(40°, 40°)
Beam 150-1—(40°, −40°)
Beam 150-2—(−40°, −40°)
Beam 150-3—(−40°, 40°)

As FIG. 5A illustrates the beam patterns that are generated by a single one of the lensed multi-beam sub-arrays 120, the beams 150 that are generated are relatively wide. When the twelve radiating elements 130 that point in a particular direction are used together to form an antenna beam 152, the beam narrows considerably due to the array factor. Moreover, the beams 152 may also be electronically steered by applying a linear phase offset across the radiating elements 130. Thus, while each antenna beam 152 may be narrow in terms of both azimuth and elevation beamwidth, the beam 152 may be steered to point directly at a user 20.

With respect to the example wide-scan antenna 100, the beams 152-1 through 152-5 that are formed by the five sub-groups of radiating elements 130 point to five locations, that are each separated from the next closest location by 40 degrees in both azimuth and, elevation when the beams 152-1 through 152-5 are not electronically scanned. Thus, if each beam 152 is allowed to be electronically scanned up to about 25 degrees in azimuth and elevation, then a large "coverage area" may be defined where one of the five beams 152 may be scanned to provide coverage to a user without having to electronically scan the beam more than about 25 degrees in azimuth and elevation. This is shown schematically in FIG. 5B, which illustrates the five regions 160-1 through 160-5 of the overall coverage area of the wide-scan antenna 100 that are served by the five respective sub-groups of radiating elements 130. In particular, FIG. 5B is a schematic plan view of the wide-scan antenna 100. In the example of FIG. 5B, the upper left radiating element 130-1 of each lensed multi-beam sub-array 120 is used to service region 160-1, the upper right radiating element 130-2 of each lensed multi-beam sub-array 120 is used to service region 160-2, the lower right radiating element 130-3 of each lensed multi-beam sub-array 120 is used to service region 160-3, the lower left radiating element 130-4 of each lensed multi-beam sub-array 120 is used to service region 160-4, and the central radiating element 130-5 of each lensed multi-beam sub-array 120 is used to service region 160-5. The same may be true with respect to the other eleven lensed multi-beam sub-arrays 120. It should be noted that while the "coverage, area" for the antenna 100 is defined above based on the amount of scanning for each antenna beam, in reality the antenna beams 152 may be scanned much farther and hence provide an expanded coverage area, albeit some loss in performance may occur due to gain loss, beam asymmetries and or grating lobe generation. It is anticipated that the wide-scan antennas according to embodiments of the present invention may scan +/−80 degrees from mechanical boresight and still provide a high level of performance, at least in many embodiments.

In other words, when a mobile user 20 is located in service region 160-1, the twelve radiating elements 130-1 of the wide-scan antenna 100 (i.e., the radiating elements 130 located in the upper left corner of each of the twelve lensed multi-beam sub-arrays 120) may be operated as a phased array antenna to generate an antenna beam 152-1 that is pointed at the mobile user 20. The twelve radiating elements 130-1 may be used to generate a narrow pencil beam 152-1 as the relatively large aperture size of the array and the RF spherical lenses 140 narrow the beamwidth of the generated antenna beam 152-1. To the extent that the mobile user 20 is not located in the center of the service region 160-1, the twelve radiating elements 130-1 may be amplitude and/or phase weighted to scan the pencil beam 152-1 to the location of the user 20 within the service region 160-1.

Notably, since the twelve radiating elements 130-1 that are used to generate the pencil beam 152-1 are already physically pointed in the direction of service region 160-1, only a relatively small amount of scanning (e.g., 20 degrees or less in both azimuth and elevation) is necessary to generate the pencil beam 152-1 that is pointed toward any particular sub-area of the service region 160-1. The same is true with respect to the remaining four service regions 160-2 through 160-5. Since the pencil beams 152 need only be scanned about a relatively small region (namely a particular one of the service regions 160), they will only be scanned a relatively small amount (e.g., less than 20 degrees in azimuth and elevation). As such, the above-described negative effects of beam scanning (i.e., reduced gain, distorted beam pattern and the generation of grating lobes) can largely be avoided. This provides a significant performance improvement as compared to conventional phased array antennas.

In some embodiments, the wide-scan antenna may be used to simultaneously generate five orthogonal pencil beams 152 using the five above-described sub-groups of twelve radiating elements 130 each. Each pencil, beam 152 may be in a different one of the service regions 160 and may exhibit minimal degradation due to scanning as the pencil beams 152 need only be scanned a relatively small amount to move the pencil beams 152 throughout their respective service regions 160. Moreover, each pencil beam 152 may be used to transmit and receive signals within the same frequency band as the pencil beams 152 are orthogonal with respect to each other and hence will result in negligible interference. Accordingly, the wide-scan antenna 109 may (1) provide high gain (due to the narrow beamwidths of the pencil beams 152, (2) allow for frequency reuse and hence increased spectral efficiency, (3) reduce or minimize scanning losses as compared to conventional phased array antennas and (4) provide a much wider scanning capability (as noted above, scanning of +/−80 degrees or more is possible), These capabilities may translate into significantly enhanced performance.

It will likewise be appreciated that the wide-scam antenna 100 may be used to simultaneously generate more than five antenna beams, and that the wide scan antenna 100 may service more than five users 29. For example, in some applications, a large number of users 20 may be present in a particular service region 160 at any given time, in some embodiments, a time division multiplexing scheme may be used where each user 20 is assigned a specific time slot and during that time slot the wide-scan antenna 100 is configured to generate a pencil beam 152 that provides coverage to a particular user 20. This pencil beam 152 may be pointed at different locations within a service region 160 during each distinct time slot in order to service the different users 20 within the service region 160. In other embodiments, the twelve radiating elements 130 may be sub-divided into smaller groups that simultaneously generate multiple beams within a given service region 160. It will also be appreciated that, if necessary, the radiating elements (e.g., radiating elements 130-1) that are associated with a first service region (e.g., service region 160-1) may be scanned further to form a pencil beam 152 in a second service region (e.g., service region 160-2). When such scanning is performed the above-described negative effects of beam scanning may occur (i.e., gain loss, beam distortion, grating lobe generation). Such scanning may be necessary when a large number of users 20 are simultaneously clustered within a particular service region 160.

While the wide-scan antenna 100 may be used to form a plurality of pencil beams 152, it will also be appreciated that the radiating elements 139 may be phase adjusted or lensed multi-beam sub-arrays combined to generate larger beams, including, for example, a single hemispherical beam. Thus, the wide-scan antenna 100 may be used in variety of different modes depending upon the particular application.

Pursuant to some embodiments of the present invention, the wide-scan antennas disclosed herein may be used for massive multi-input-multi-output (MIMO) antenna applications.

The wide-scan antenna 100 of FIGS. 1-2B represents one example embodiment of the wide-scan antennas according to embodiments of the present invention. It will be appreciated in light of the present disclosure that many modifications may be made thereto while still achieving the unique benefits provided by the concepts disclosed herein.

By way of example, in the wide-scan antenna 100, a total of five radiating elements 130 are included in each lensed multi-beam sub-array 120. It will be appreciated, however, that both the number of radiating elements 130 and the positioning of the radiating elements 130 about the spherical RF lens 140 may be varied in other embodiments. By way of example only, FIGS. 6A-6F are schematic front views of lensed multi-beam sub-arrays 120A through 120F according to further embodiments of the present invention that may be used in place of the lensed multi-beam sub-array 120.

Figure 6A:
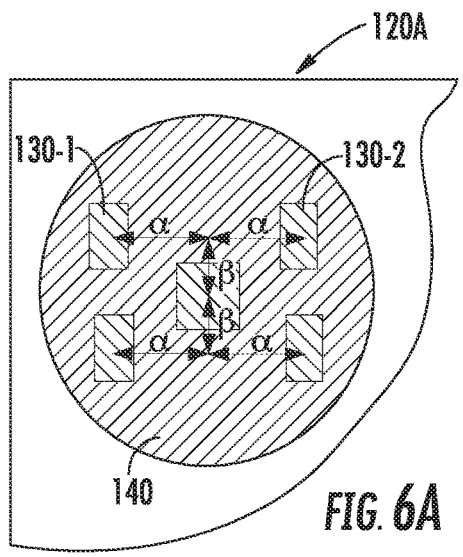
FIGS. 6A-6F are schematic front views of lensed multi-beam sub-arrays according to further embodiments of the present invention.

As shown in FIG. 6A, the lensed multi-beam sub-array 120A is very similar to the lensed multi-beam sub-array 120, with the only difference being the offset of each outer radiating element 130 from the central radiating element 130. In particular, as discussed above, the outer radiating, elements 130 of the lensed multi-beam sub-array 120 are offset by 40 degrees in both azimuth and elevation from the central radiating element 130. In contrast, the outer radiating elements 130 of the lensed multi-beam sub-array 120A are offset by 40 degrees in azimuth but only 20 degrees in elevation from the central radiating element 130. Thus, the coverage area of the lensed multi-beam sub-array 120A will be compressed in the elevation direction as compared to the lensed multi-beam sub-array 120. While $\alpha=40$ degrees and $\beta 20$ degrees in the particular embodiment shown in FIG. 6A, it will be appreciated that any suitable values for $\alpha$ and $\beta$ may be selected based on a desired application and coverage area.

Figure 6B:
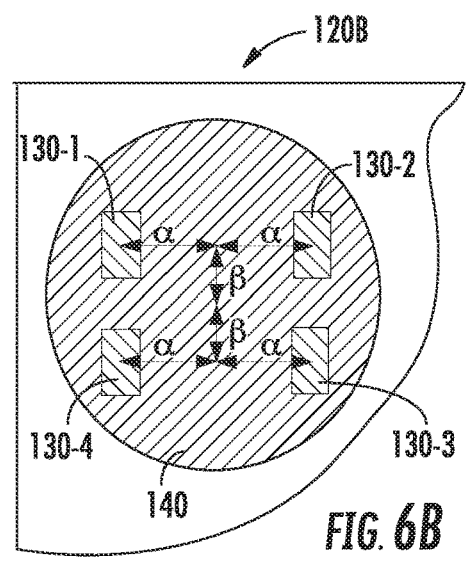
Figure 6C:
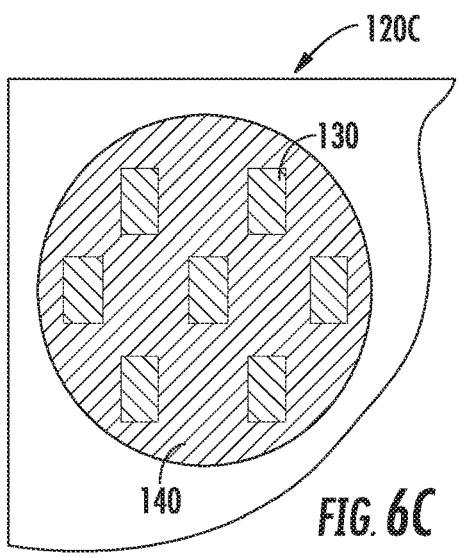
Figure 6D:
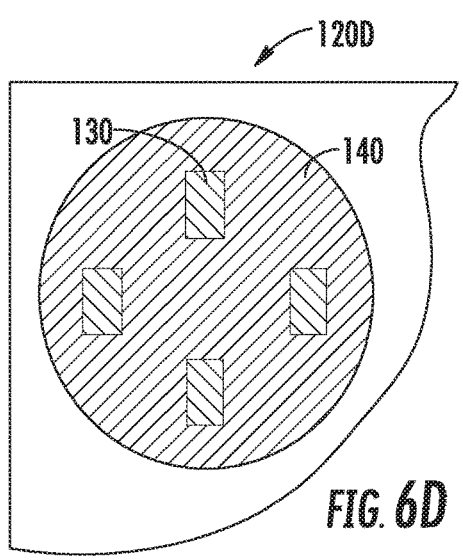
Figure 6E:
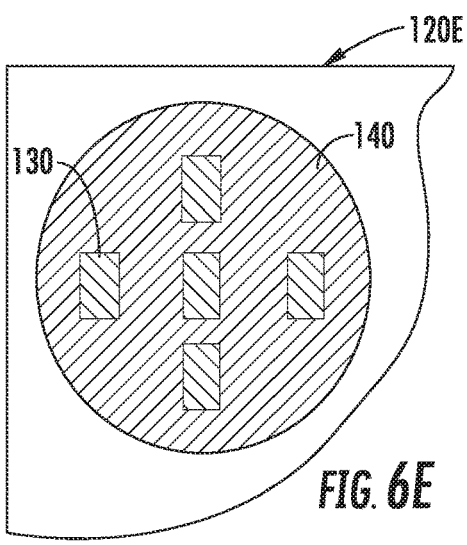
Figure 6F:
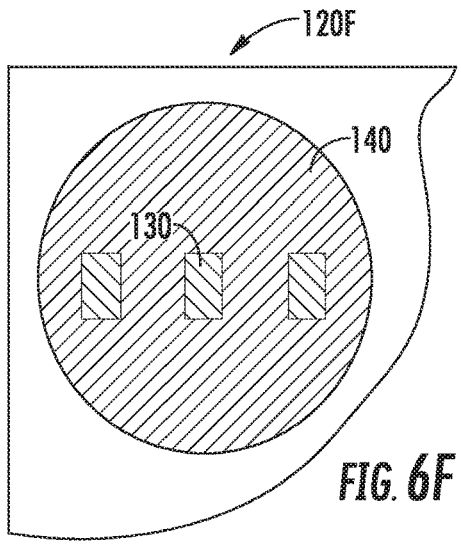

FIG. 6B illustrates another lensed multi-beam sub-array 1201. The lensed multi-beam sub-array 120B is also similar to the lensed multi-beam sub-array 120B, with the primary difference being that the central radiating element 130-5 is omitted in the lensed multi-beam sub-array 120B. FIGS. 6C-6F illustrate other example configurations for the lensed multi-beam sub-array 120 that further vary the number of radiating, elements 130 and the positions where the radiating elements 130 are orbitally mounted about the spherical RF lens 140 it will be appreciated that, any appropriate azimuth and elevation offsets ($\alpha,\beta$) may be selected for each of these embodiments.

Figure 7A:
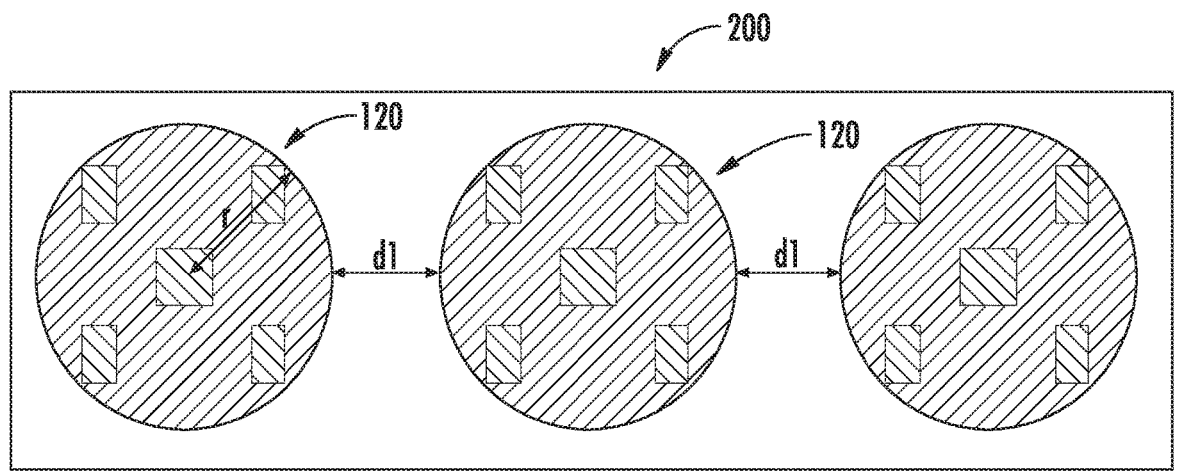
Figure 7B:
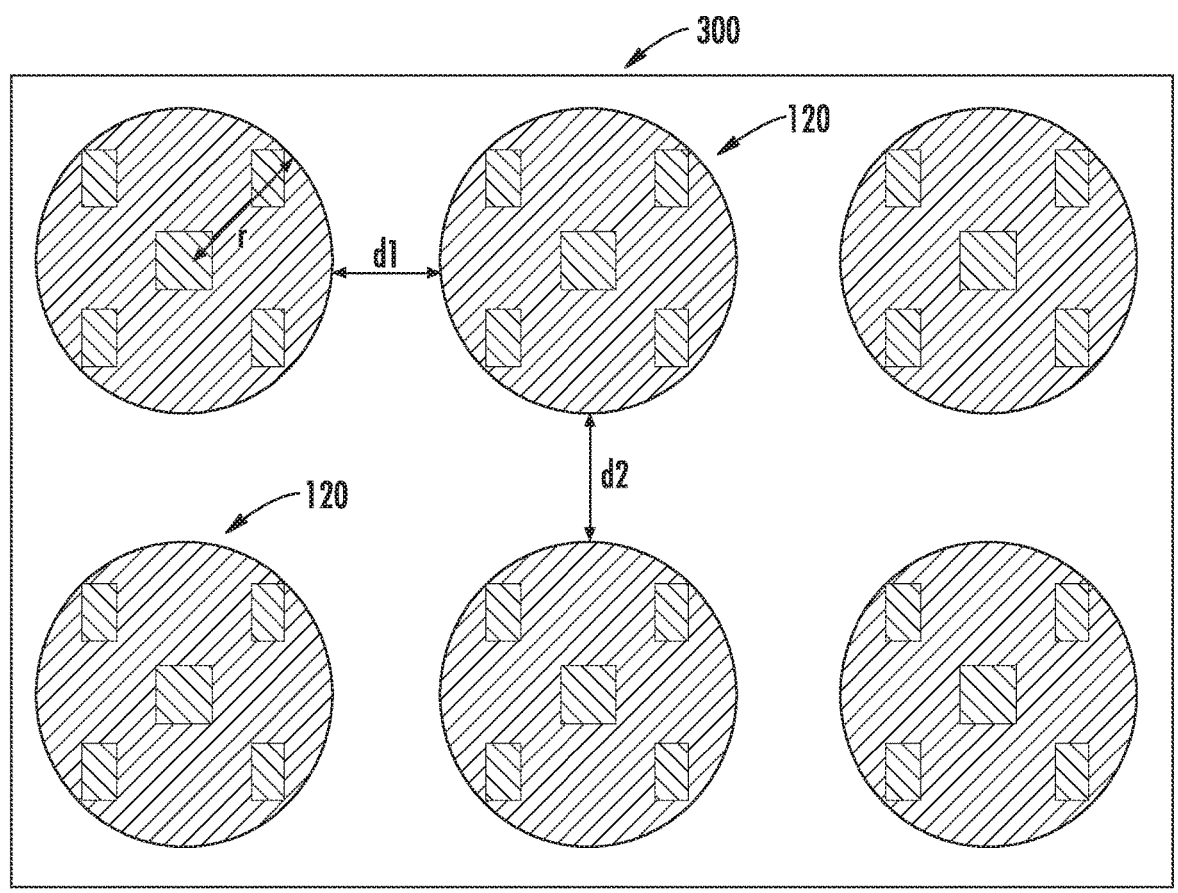

FIGS. 7A-7C are schematic front views of wide-scan phased array antennas according to further embodiments of the present invention.

Referring to FIG. 7A, a wide-scan antenna 200 is illustrated that includes a total of three lensed multi-beam sub-arrays 120 that are arranged in a 1×3 array. This smaller array may be acceptable for many applications. Referring to FIG. 7B, a wide-scan antenna 300 is illustrated that includes a total of six lensed multi-beam sub-arrays 120 that are arranged in a 2×3 array. Referring to FIG. 7C, a wide-scan antenna 400 is illustrated that includes a total of five lensed multi-beam sub-arrays 120 that are arranged, in an "X" shaped pattern. This arrangement illustrates that the sub-arrays 120 do not necessarily need to be disposed in rows and columns. The arrangement of FIG. 7C may also result in less shadowing, as is discussed in further detail below.

As is further shown in FIGS. 7A-7B, in some embodiments, the radius of each spherical RF lens 140 may be r, the distance between adjacent spherical RF lenses 140 in the same row may be d1, and the distance between adjacent spherical RF lenses 140 in the same column may be d2. In an example embodiment, rays be equal to d1 and/or r may be equal to d2. In the example of FIG. 7C, d1 may be equal to 2r in some embodiments and d2 may be equal to r.

It will be appreciated that the wide-scan antennas according to embodiments of the present invention may be operated in a variety of different ways. For example, in some embodiments, the active radiating elements 130 may be used in conjunction with a switching network so that different antenna beams are formed for each time slot of a time division multiplexing communication (TDMA) scheme. This switching may be performed, for example, by the radio portion of each active radiating element 130 so that signals that are intended for different users 20 are transmitted during different time slots of the TDMA scheme. Such an approach may be used when multiple, users 20 may be present in a coverage area at the same time. The transmitted signals may be appropriately amplitude and/or phase weighted by the active radiating elements 130 during the transmissions in each time slot so that the antenna beam points at the particular user 20 that is being served during a particular time slot.

While the above-described wide-scan antennas according to embodiments of the present invention use active radiating elements 130, it will be appreciated that in other embodiments passive radiating elements may be used that are connected to a corporate feed network. A variety of different embodiments that use such corporate feed networks are possible.

In some embodiments, the radiating elements 130 may be fed by a switched corporate feed network that selectively supplies signals from a radio to groups of one or more of the radiating elements 130 during the time slots of a time division multiplexing communication scheme. The switched corporate feed network may be switched at high speeds so as to direct the signal to be transmitted during any particular time slot to the radiating elements 130 that provide coverage to portions of the coverage area that include users who transmit/receive signals during mat particular time slot. During the next time slot, the switch network may be reconfigured to selectively supply the signal from the radio to a different subset of the radiating elements 130 that provide coverage to portions of the coverage area that include users who transmit/receive signals during this subsequent time slot.

Figure 11A:
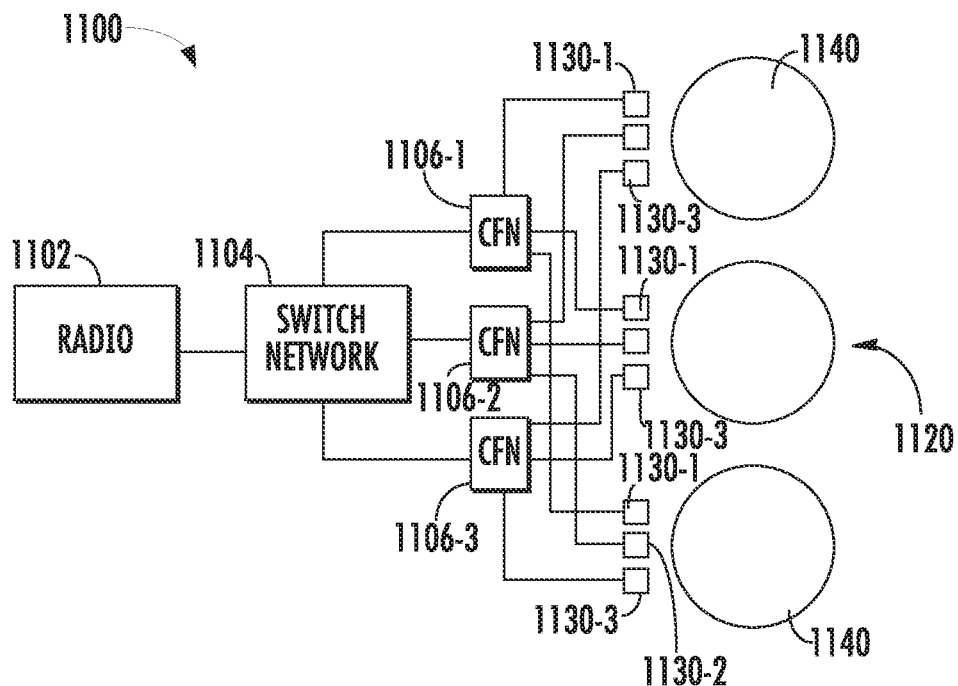
FIG. 11A is a schematic block diagram of a wide scan antenna according to further embodiments of the present invention.

For example, referring to FIG. 11A, a wide scan antenna 1100 according to embodiments of the present invention is depicted that includes a radio 1102 and a high speed switching network 1104. The wide scan antenna 1100 includes three lensed multi-brain sub-arrays 1120, each of which has three associated radiating elements 1130 that are orbitally arranged. Note that the orbital arrangement of the radiating elements 1130 is not shown in FIG. 11A to simplify the drawing, but the radiating elements could be arranged in the orbital arrangement of, for example, FIG. 6G which is described above. It will also be appreciated that any of the lensed multi-beam sub array designs described herein could be used in place of the lensed multi-beam sub-array 1140 depicted in FIG. 11A, with the switching network 1104 and the number of corporate feed networks (described below) modified accordingly. It will also be appreciated that more or fewer lensed multi-beam sub arrays 1140 may be included in the antenna 1100.

Figure 11B:
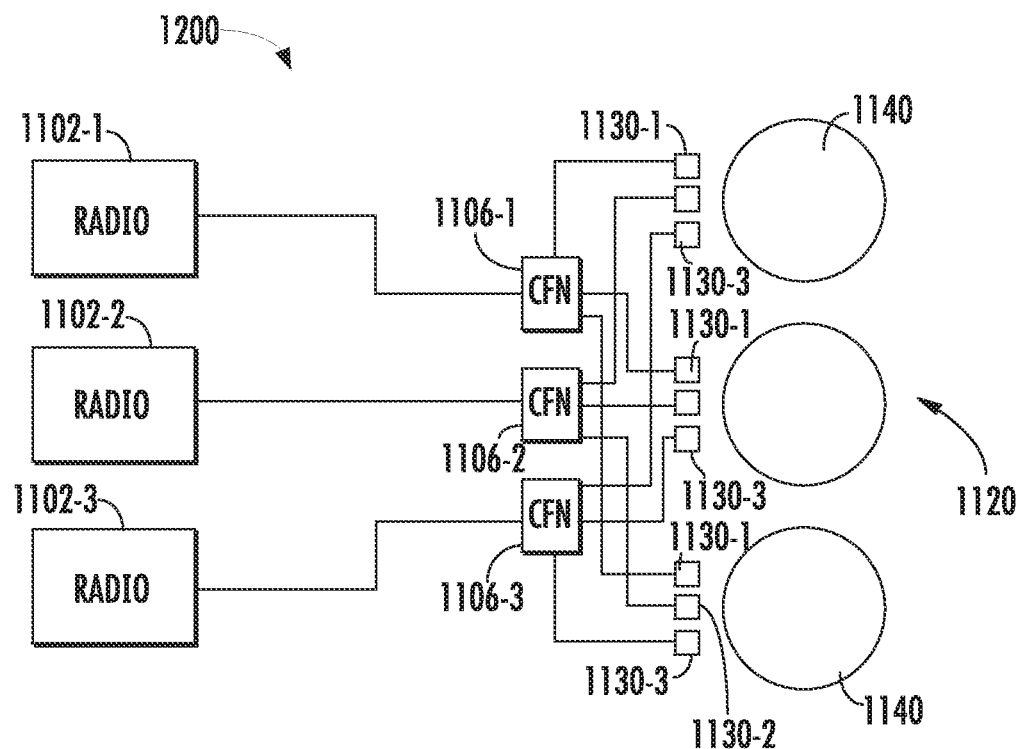
FIG. 11B is a schematic block diagram of a modified version of the wide scan antenna of FIG. 11A.

As shown in FIG. 11A, the switch network 1104 delivers the output of the radio 1102 to one of three corporate feed networks 1106-1 through 1106-3. Corporate feed network 1106-1 splits any signal delivered thereto by the switch network 1104 and feeds the split signal to the three radiating elements 1130-1 that point in a first direction. Corporate feed, network 1106-2 splits any signal delivered thereto by the switch network 1104 and feeds the split signal to the three radiating elements 1130-2 that point in a second direction. Corporate feed network 1106-3 splits any signal delivered thereto by the switch network 1104 and feeds the split signal to the three radiating elements 1130-3 that point in a third direction. The switching network 1104 may be used to select which of three sub-groups of radiating elements 1130 are used to transmit a signal at any given time. The radiating elements 1130 and spherical RF lenses 1140 may be selected so that each sub-group of radiating elements will provide suitable coverage for a desired coverage area, as the antenna beams in the embodiment of FIG. 11A may not be designed to be electronically steerable, FIG. 11B illustrates a wide scan antenna 1200 according to further embodiments of the present invention that is similar to the wide-scan antenna 1100. However, the wide-scan antenna 1200 includes three separate radios eliminating any need for the high speed switching network 1104. Each radio 1102 may provide an RF signal to one of the three sub-groups of radiating elements 1130. Thus, the antenna 1200 will work in a manner similar to the antenna 1100 that is described above, but may simultaneously provide an antenna beam in each of three different coverage areas. It will also be appreciated that the radios 1102 may be operated in a time division multiplexed manner to transmit different signals during different time slots in order to serve multiple users who may be present in a given coverage area.

Figure 11C:
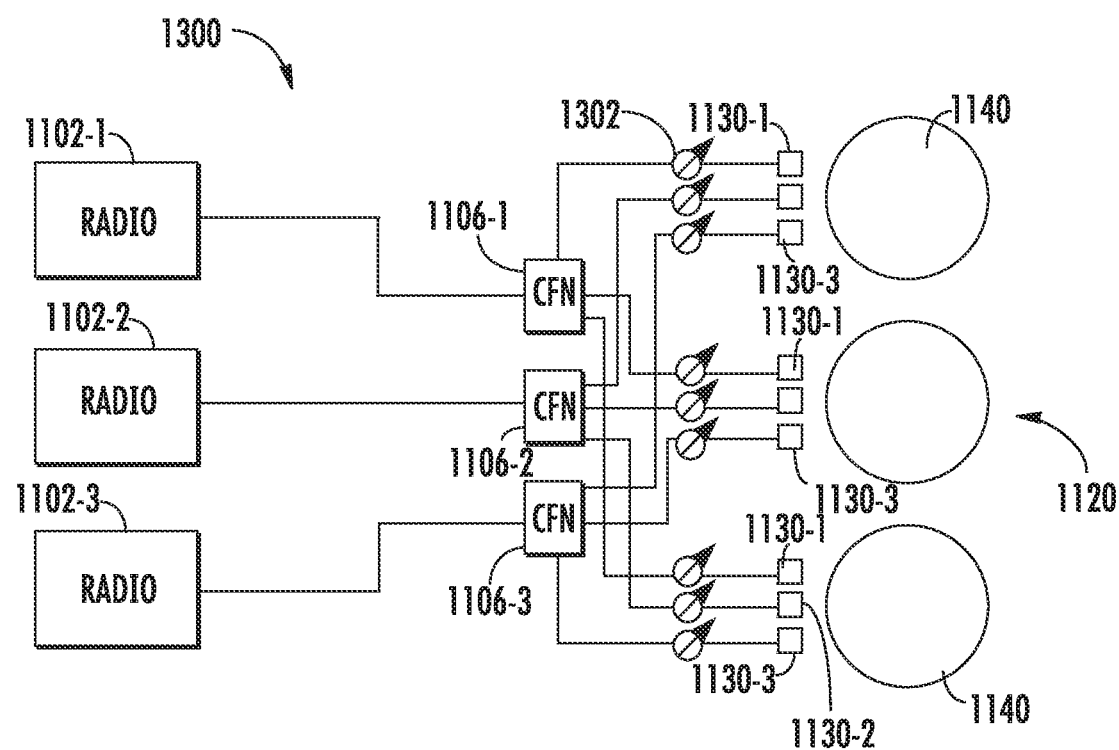
FIG. 11C is a schematic block diagram of a wide scan antenna according to still further embodiments of the present invention.

FIG. 11C is a schematic block diagram of a wide scan antenna 1300 according to still further embodiments of the present invention. The wide-scan antenna 1300 is similar to the wide-scan antenna 1200 that is discussed above, but the wide-scan antenna 1300 also includes an electronic RF phase shifter 1302 for each radiating element 1130. The electronic RF phase shifters 1302 may be used to modify the phase of the signals delivered to each radiating element 1130 in order to electronically steer the antenna beams. Accordingly, the radiating elements 1130 and spherical RF lenses 1140 may be designed in the manner discussed above with reference to wide-scan antenna 100 to generate pencil antenna beams and the RF phase shifters 1302 may be used to steer these pencil beams throughout a coverage area. It will also be appreciated that passive phase shifters could also be used in some embodiments in place of the electronic RF phase shifters 1302 shown in FIG. 11C. In some embodiments, baseband beam steering may also or alternatively be applied. While not shown in FIG. 11C, a power amplifier may also be included between each RF phase shifter 1302 and its associated radiating element 1130, in some cases, different antennas may be used for transmit and receive, particularly in very high frequency operations where the components are small so that a second array may provide advantages over an antenna that is designed to support both transmit and receive operations. In antennas that combine the transmit and receive functions additional switches and/or duplexers may also be provided so that the radiating elements may be used for both transmission and reception.

It will also be appreciated that a wide variety of additional approaches could be used for feeding the radiating elements of the array antennas according to embodiments of the present invention. As one example, in another embodiment, a corporate feed network could be provided that connects a radio to all of the radiating elements in a particular lensed multi-beam sub-array 120. A plurality of such corporate feed networks could be provided, with one such corporate feed network provided for each lensed multi-beam sub-array 120. These corporate feed networks could be coupled to a single radio via a switching network or to a plurality of radios. As another example, the embodiments of FIGS. 11A-11C could be modified so that a single corporate feed network fed multiple of the radiating elements in each lensed multi-beam sub-array. For instance, the embodiments of FIGS. 11A-11C could be modified so that one corporate feed network fed two of the radiating elements of each lensed multi-beam sub-array while a separate corporate feed network fed the third radiating element of each lensed multi-beam sub-array, thereby requiring two corporate feed networks as opposed to three. Thus, it will be appreciated that corporate feed networks may be provided that feed the radiating elements in any way without departing from the scope of the present invention.

Referring again to FIG. 1, it should be noted that if the outer radiating elements 130 are offset by large azimuth and/or elevation angles from the mechanical boresight of a particular lensed multi-beam sub-array 120, part of the antenna beam generated by one or more of the outer radiating elements 130 may impinge on the spherical RF lens 140 of an adjacent lensed multi-beam sub-array 120. This effect is referred to herein as "shadowing," and is a generally undesired effect. The amount of shadowing that occurs will be a function of, among other things, the diameter of the RF lenses 140, the spacing between adjacent RF lenses 140 and the azimuth and elevation offsets of the radiating elements 130 front the mechanical boresight or each lensed multi-beam sub-array 120. These factors may be adjusted to reduce shadowing as necessary. Additionally, the arrangement of the lensed multi-beam sub-arrays 120 may also be modified as shown, for example, in FIG. 7C in order to further reduce or eliminate such shadowing.

Pursuant to further embodiments of the present invention, the lensed multi-beam sub-arrays 120 may be three-dimensionally arranged instead of the two-dimensional arrangements illustrated in the example embodiments depicted in FIGS. 1 and 7A-7C. For example, FIG. 8A is a schematic side-view of a three-dimensional wide-scan antenna 500 according to embodiments of the present invention that mounts the lensed multi-beam sub-arrays 120 in a stair-step fashion in order to decrease the effects of shadowing. The antenna 500 pictured in FIG. 8A includes four rows of lensed multi-beam sub-arrays 120, where each row may include one or more lensed multi-beam sub-arrays 120.

FIG. 8B is a schematic side-view of a three-dimensional wide-scan antenna 600 according to still further embodiments of the present invention that mounts the lensed multi-beam sub-arrays 120 along a curved surface in order to decrease the effects of shadowing. The antenna 500 pictured in FIG. 8B includes four rows of lensed multi-beam sub-arrays 120, where each row may include one or more lensed multi-beam sub-arrays 120.

Figure 9A:
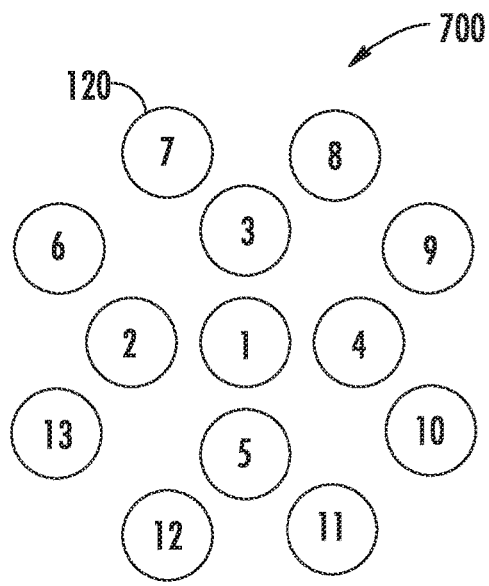
FIG. 9A is a schematic top view of a wide-scan antenna according to further embodiments of the present invention that provides 360 degree coverage.
Figure 9B:
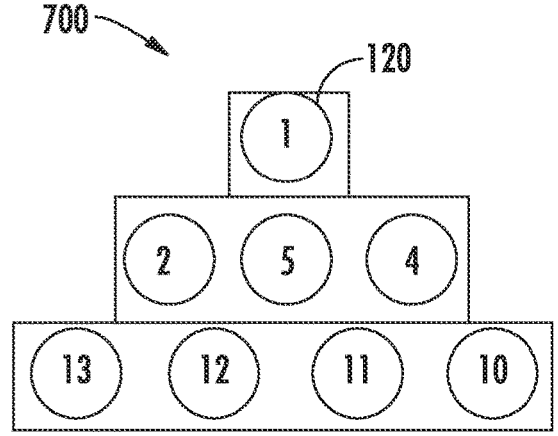
FIG. 9B is a schematic side view of the wide scan antenna of FIG. 9A.
Figure 9C:
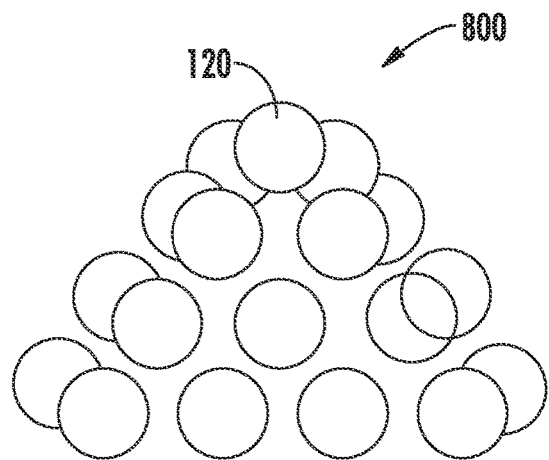
FIG. 9C is a schematic top view of a wide-scan antenna according to additional embodiments of the present invention that provides 360 degree coverage.

FIGS. 9A-9C schematically illustrate two additional wide-scan antennas according to embodiments of the present invention. The antennas shown in FIGS. 9A and 9B may be used to provide coverage in all directions.

In particular, FIG. 9A is a schematic top view of a wide-scan antenna 700 that includes a plurality of lensed multi-beam sub-arrays 120 that are mounted in a wedding cake structure. FIG. 9B is a schematic side view of the wide scan antenna 700 of FIG. 9A. As shown in FIGS. 9A-9B, the wide-scan antenna 700 includes a total of thirteen lensed multi-beam sub-arrays 120 that are stacked vertically at three levels. Each of the lensed multi-beam sub-arrays 120 may have the configuration shown in FIGS. 2A-2B. The radiating elements 130 are not shown in FIGS. 9A-9B in order to simplify the drawings. The bottom level includes eight of the lensed multi-beam sub-arrays 120 arranged in a circular pattern. The middle level includes four lensed multi-beam sub-arrays 120 which also are arranged to define a circle. The top level includes a single lensed multi-beam sub-array 120. The antenna 700 may provide full 360 degree coverage as lensed multi-beam sub arrays 120 are provided that are arranged, in full circles. FIG. 9C schematically illustrates an alternative wide-scan antenna 800 that likewise provides full 360 degree coverage. As shown in FIG. 9C, the wide-scan antenna 800 comprises a plurality of lensed multi-beam sub-arrays 120 that are mounted on a hemispherical mounting structure (not shown).

When the transmission frequencies move to high frequency bands such as, for example, the 28 GHz or 60 GHz frequency bands, the sizes of all of the components of the antenna (e.g., the radiating elements, spherical lenses, etc.) become much smaller. In these higher frequency ranges, it becomes possible to implement wide-scan antennas according to embodiments of the present invention using RFIC SiP (radio frequency integrated circuit system in package) technologies. For example, U.S. Pat. No. 8,706,049 ("the '049 patent") discloses RFIC SiP modules that integrate an antenna array with RF transceivers in men integrated circuit package. The entire contents of the '049 patent is incorporated herein by reference. The antenna used in the RFIC SiP modules of the '049 patent employs a two dimensional 3×3 array of nine radiating elements that are mounted on a top surface of the package.

Pursuant to embodiments of the present invention, RFIC SiP modules having the design of the '049 patent may be provided that are modified to have a one dimensional array of radiating elements instead of a two-dimensional array. For example, the RFIC SiP module may include four radiating elements that are arranged in a 4×1 linear array. Three of these RFIC SiP modules may then be mounted in an angled relationship, and four spherical RF lenses 140 may be positioned so that each spherical RF lens 140 has one radiating element from each array mounted orbitally thereto. Such an arrangement is shown in FIG. 10A.

Figure 10A:
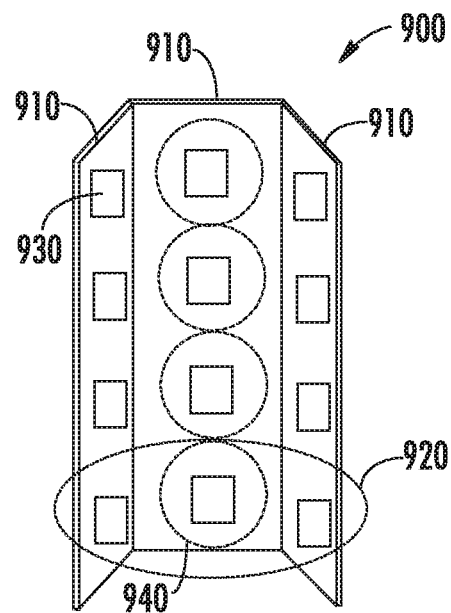
FIG. 10A is a schematic side view of a wide-scan antenna according to embodiments of the present invention that is implemented using RF integrated circuit technology.

In particular, as shown in FIG. 10A, a wide-scan antenna 900 is provided that includes three RFIC SiP modules 910. Each RFIC SIP module 910 includes a 4×1 linear array of radiating elements 930. As shown, each of the three RFIC SiC modules 910 are mounted vertically and the modules are angled with respect to each other at angles of about, for example, 40 degrees. A plurality of spherical RF lenses 940 (the locations of which are shown schematically by dashed circles in FIG. 10A) are placed in front of the RFIC SiC modules 910 so that one radiating element 930 from each RFIC SIC module 910 is orbitally arranged with respect to each spherical RF lens 940. Thus, each spherical RF lens 940 and its three associated radiating elements 930 form a lensed multi-beam sub-array 920. These lensed multi-beam sub-arrays 920 may be similar to the lensed multi-beam sub-array 120F illustrated in FIG. 6F above.

Figure 10B:
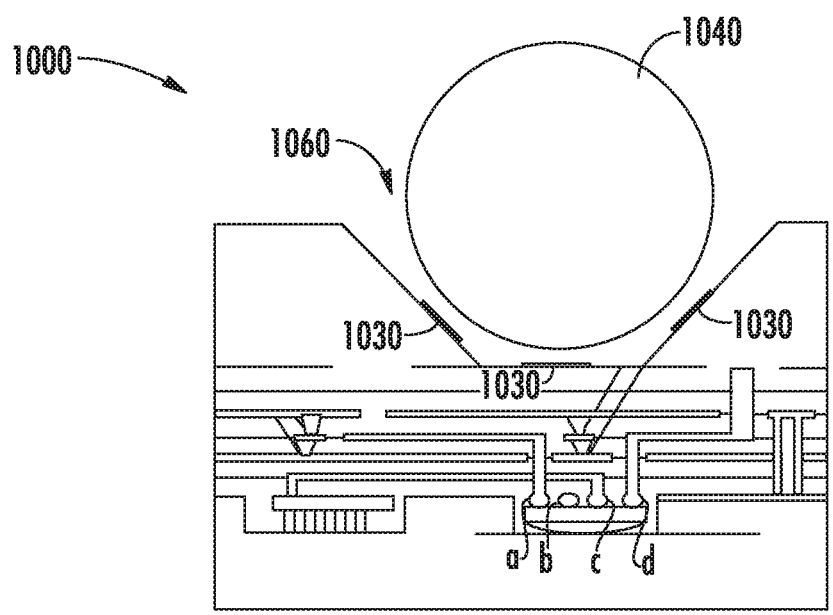
FIG. 10B is a schematic side view of a RFIC SiP module according to embodiments of the present invention.

FIG. 10B is a schematic side view of a RFIC SiP module 1000 according to embodiments of the present invention that is suitable for use in the wide-scan antennas according to embodiments of the present invention. The RFIC SiP module 1000 is based on the RFIC SiC modules of the '049 patent. However, as shown in FIG. 10B, the integrated circuit chip is formed to have a contoured upper surface so that the radiating elements thereof may be arranged orbitally with respect to a spherical RF lens. In particular, the upper surface of the integrated circuit chip, may be grown thicker, and a recess 1060 may be formed therein. This recess 1060 maybe, for example, a hemispherical semi-circular recess. The radiating elements 1030 may be arranged on the surface of the hemispherical recess 1060. A spherical RF lens 1040 may be mounted within the recess so that the radiating elements 1030 are arranged orbitally with respect to the spherical RF lens 1040. In an example embodiment, five radiating elements 1038 may be provided and they may be mounted with respect to the spherical RF lens 1040 in the manner shown in FIGS. 2A-28 above.

It will also be appreciated that the wide-scan antennas according to embodiments of the present invention may be used in massive MIMO applications where antenna arrays measure the amplitude and phase of a received wavefront at each element of the array and then use this information to pre-distort the RF signals that are transmitted through the antenna. This approach is useful in situations where reflections off buildings and other structures result in a received wave-front that suffers from multipath fading as different reflections of the transmitted signal are received at the antenna at different times. By pre-distorting the signal transmitted through the antenna it may be possible to pre-correct for the multipath fading effects to improve signal performance. Such an approach is discussed in greater detail in a Master's Thesis submitted by Clayton W. Shepard to Rice University titled Argos: Practical Base Stations for Large-scale Beamforming. The entire contents of this thesis are incorporated herein by reference. Various algorithms can be used in these systems to optimize signal-to-noise or signal-to-(noise+interference) at the receiver. Because the wide-scan antennas according to embodiments of the present invention receive signal energy over very wide ranges of azimuth and elevation angles, the antennas according to embodiments of the present invention can more accurately measure the channel characteristics and hence can better pre-distort the transmitted signal to correct for the multipath fading effects.

The wide-scan antennas according to embodiments of the present invention may be implemented using a variety of different technologies including cellular base station antenna technology, ceramic SoC, silicon, etc.

The wide-scan antennas that are disclosed herein may have a number of advantages as compared to a conventional planar array phased array antenna. The spherical RF lenses 140 act to narrow the beams of the radiating elements 130 in both the azimuth and elevation directions. As a result, the wide-scan antennas may have a substantially smaller number of radiating element 130 as compared to the number of radiating elements 130 required if the RF lenses 140 were not provided. This may reduce the cost and the weight of the antenna. Additionally, because the radiating elements 130 are orbitally arranged around the spherical RF lens 140, different radiating elements 130 point in different directions and hence the antenna beams 152 need not be scanned nearly as far as would be necessary with a conventional phased array antenna. The antennas according to embodiments of the present invention also exhibit high antenna gain and allow for frequency reuse. Thus, it is expected that the antennas according to embodiments of the present invention may be less expensive than comparable planar array antennas and/or provide improved performance.

While the description above has primarily used wide-scan antennas for massive MIMO applications as an example, it will be appreciated that the wide-scan antennas disclosed herein may be useful in a wide variety of different applications including, for example, base station antennas for cellular communication systems, radar systems, aviation applications, wireless backhaul, fixed wireless access and the like.

It will likewise be appreciated that the types of radiating elements used and the properties for individual RF lenses can be varied to effect the radiation properties of the combination of a radiating element and an associated RF lens and/or the radiation properties of the entire array, RF lenses can also be omitted with respect to some of the radiating elements in some embodiments.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An array antenna, comprising:
    a plurality of lensed multi-beam sub-arrays, each lensed multi-beam sub-array comprising:
        a radio frequency ("RE") lens; and
        a plurality of radiating elements that are associated with the RF lens and that are orbitally arranged about the RF lens,
    wherein each of a plurality of sub-groups of the plurality of radiating elements in different ones of the plurality of lensed multi-beam sub-arrays have a same pointing direction,
    wherein ones of the plurality of sub-groups of radiating elements are configured to generate respective antenna beams, and
    wherein the respective antenna beams of different ones of the plurality of sub-groups of the plurality of radiating elements have different pointing directions from one another.

2. The array antenna of claim 1, wherein the RF lenses are arranged in an M×N array having M rows and N columns.

3. The array antenna of claim 1, wherein the radiating elements of each lensed multi-beam sub-array are located in the same orbital positions.

4. The array antenna of claim 3, further comprising a plurality of corporate feed networks.

5. The array antenna of claim 4, wherein a number of corporate feed networks is equal to a number of radiating elements included in each lensed multi-beam sub-array.

6. The array antenna of claim 5, further comprising a switching network that selectively connects a radio to individual ones of the corporate feed networks on a time slot-by-time slot basis.

7. The array antenna of claim 1, wherein each RF lens comprises a spherical RF lens.

8. The array antenna of claim 1, wherein each radiating element comprises an active radiating element.

9. The array antenna of claim 1, wherein the plurality of radiating elements that are orbitally arranged about each RF lens comprise a central radiating element and a plurality of outer radiating elements.

10. An array antenna, comprising:
    a plurality of lensed multi-beam sub-arrays, each lensed multi-beam sub-array comprising:
        a radio frequency ("RF") lens; and
        a plurality of radiating elements that are associated with the RF lens that are mounted between the RF lens and a mounting structure, wherein each radiating element is mounted in a different position with respect to its associated RF lens, and each RF lens has its associated radiating elements mounted in the same positions as the other of the RF lenses; and
    a plurality of corporate feed networks,
    wherein each corporate feed network is coupled to a group of radiating elements comprising ones of the radiating elements of each of different ones of the plurality of lensed multi-beam sub-arrays.

11. The array antenna of claim 10, wherein a first of the corporate feed networks is coupled to the radiating elements of each lensed multi-beam sub-array that are mounted in the same positions with respect to their associated RF lens.

12. The array antenna of claim 11, wherein each corporate feed network is connected to a respective one of a plurality of radios.

13. The array antenna of claim 10, further comprising a plurality of electronic phase shifters, wherein each phase shifter is coupled to a respective one of the radiating elements.

14. The array antenna of claim 10, wherein each radiating element is arranged orbitally with respect to its associated RF lens.

15. An array antenna, comprising:
a plurality of lensed multi-beam sub-arrays, each lensed multi-beam sub-array comprising:
a radio frequency ("RE") lens; and
a plurality of radiating elements that are associated with the RF lens;
wherein the RF lenses are arranged in a three dimensional arrangement, and
wherein each of a plurality of sub-groups of the plurality of radiating elements in different ones of the plurality of lensed multi-beam sub-arrays have a same pointing direction, and
wherein ones of the plurality of sub-groups of radiating elements are configured to generate respective antenna beams, and
wherein the respective antenna beams of different ones of the plurality of sub-groups of the plurality of radiating elements have different pointing directions from one another.

16. The array antenna of claim 15, wherein at least two of the RF lenses are arranged in a stair-step pattern.

17. The array antenna of claim 16, wherein the RF lenses are also arranged in horizontal rows when the array antenna is mounted for use, wherein each row includes at least two RF lenses.

18. The array antenna of claim 15, wherein at least two of the RF lenses are arranged along a curve.

19. The array antenna of claim 15, wherein a first subset of the RF lenses are arranged to define a first circle.

20. The array antenna of claim 19, wherein a second subset of the RF lenses are arranged to define a second circle.

21. The array antenna of claim 20, wherein the second subset of the RF lenses includes fewer RF lenses than the first subset of RF lenses.

* * * * *